United States Patent
Yonezaki et al.

(10) Patent No.: US 12,291,660 B2
(45) Date of Patent: May 6, 2025

(54) METHOD FOR PREPARING PRESSURE-SENSITIVE ADHESIVE COMPOSITION, METHOD FOR PRODUCING PROTECTIVE SHEET AND METHOD FOR PRODUCING GLASS UNIT

(71) Applicant: NITTO DENKO CORPORATION, Ibaraki (JP)

(72) Inventors: Kosuke Yonezaki, Ibaraki (JP); Hakaru Horiguchi, Ibaraki (JP); Yuta Shimazaki, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 566 days.

(21) Appl. No.: 17/418,390

(22) PCT Filed: Dec. 23, 2019

(86) PCT No.: PCT/JP2019/050314
§ 371 (c)(1),
(2) Date: Jun. 25, 2021

(87) PCT Pub. No.: WO2020/137953
PCT Pub. Date: Jul. 2, 2020

(65) Prior Publication Data
US 2022/0064494 A1  Mar. 3, 2022

(30) Foreign Application Priority Data

Dec. 27, 2018 (JP) ................................. 2018-246231

(51) Int. Cl.
*C09J 7/38* (2018.01)
*B32B 17/10* (2006.01)
(Continued)

(52) U.S. Cl.
CPC .............. *C09J 7/385* (2018.01); *B32B 17/10* (2013.01); *B32B 27/308* (2013.01);
(Continued)

(58) Field of Classification Search
CPC .................................... C09J 7/38; C09J 7/385
See application file for complete search history.

(56) References Cited

U.S. PATENT DOCUMENTS 5,126,178 A    6/1992  Takemura et al.
9,458,360 B2 * 10/2016  Kim ........................ C09J 133/06
(Continued)

FOREIGN PATENT DOCUMENTS

CN    101233203 A    7/2008
CN    105073939 A    11/2015
(Continued)

OTHER PUBLICATIONS

First Office Action dated Jan. 6, 2023 issued by China National Intellectual Property Administration in Chinese Application No. 201980086351.X.
(Continued)

*Primary Examiner* — Carson Gross
(74) *Attorney, Agent, or Firm* — Sughrue Mion, PLLC

(57) ABSTRACT

Provided is a method for preparing a PSA composition for protecting Low-E glass plates from degradation and corrosion. A PSA composition preparation method is provided for Low-E glass plate protection. The method comprises a step of obtaining an aqueous liquid, and a step of obtaining a polymer containing liquid comprising the aqueous liquid and a polymer. Here, the aqueous liquid satisfies at least (a) having an electrical conductivity below 300 μS/cm or (b) having a chloride ion concentration below 35 μg/mL.

18 Claims, 2 Drawing Sheets

(51) Int. Cl.
*B32B 27/30* (2006.01)
*C03C 23/00* (2006.01)
*C08F 220/06* (2006.01)
*C08F 220/18* (2006.01)
*C08K 5/17* (2006.01)
*C08K 5/353* (2006.01)
*C09J 7/24* (2018.01)

(52) U.S. Cl.
CPC ........ *C03C 23/0075* (2013.01); *C08F 220/06* (2013.01); *C08F 220/1804* (2020.02); *C08F 220/1808* (2020.02); *C08K 5/17* (2013.01); *C08K 5/353* (2013.01); *C09J 7/243* (2018.01); *B32B 2250/02* (2013.01); *B32B 2255/205* (2013.01); *B32B 2315/08* (2013.01); *B32B 2333/08* (2013.01); *B32B 2419/00* (2013.01); *C09J 7/38* (2018.01); *C09J 2203/37* (2020.08); *C09J 2301/12* (2020.08); *C09J 2301/302* (2020.08); *C09J 2301/408* (2020.08); *C09J 2301/414* (2020.08); *C09J 2301/502* (2020.08); *C09J 2400/163* (2013.01); *C09J 2423/046* (2013.01); *C09J 2433/00* (2013.01)

(56) References Cited

U.S. PATENT DOCUMENTS

| | | | |
|---|---|---|---|
| 2007/0222920 A1* | 9/2007 | Oka | G02F 1/133528 |
| | | | 349/96 |
| 2008/0220249 A1 | 9/2008 | Saitou et al. | |
| 2012/0135231 A1 | 5/2012 | Yoshida et al. | |
| 2012/0219795 A1 | 8/2012 | Mitsui et al. | |
| 2012/0261299 A1* | 10/2012 | Fussnegger | C08K 3/32 |
| | | | 206/524.1 |
| 2013/0344327 A1 | 12/2013 | Yoshida et al. | |
| 2014/0315018 A1* | 10/2014 | Yamagata | C09J 7/22 |
| | | | 525/204 |
| 2015/0010753 A1 | 1/2015 | Ha et al. | |
| 2016/0060490 A1 | 3/2016 | Uchida et al. | |
| 2017/0253776 A1* | 9/2017 | Kakuda | C08L 33/08 |
| 2017/0283661 A1 | 10/2017 | Yonezaki et al. | |
| 2019/0202171 A1 | 7/2019 | Yonezaki et al. | |
| 2021/0246339 A1* | 8/2021 | Lu | C08K 5/544 |

FOREIGN PATENT DOCUMENTS

| | | |
|---|---|---|
| CN | 107858116 A | 3/2018 |
| EP | 2 150 669 B1 | 2/2016 |
| JP | 04-211145 A | 8/1992 |
| JP | 3571460 B2 | 9/2004 |
| JP | 2005-75949 A | 3/2005 |
| JP | 2005-187637 A | 7/2005 |
| JP | 2012-131976 A | 7/2012 |
| JP | 5719194 B2 | 5/2015 |
| JP | 2015-104920 A | 6/2015 |
| JP | 2017-186517 A | 10/2017 |
| KR | 10-2013-0050879 A | 5/2013 |
| WO | 2016/139318 A1 | 9/2016 |
| WO | 2018/181454 A1 | 10/2018 |

OTHER PUBLICATIONS

Second Office Action issued Aug. 10, 2023 in Chinese Application No. 201980086351.X.
Extended European Search Report issued Aug. 30, 2022 in European Application No. 19904669.9.
"Conductivity", Robert B. Annis Water Resources Institute (AWRI)—Education & Outreach, 2020, pp. 1-2 (2 pages total), Retrieved from https://www.gvsu.edu/wri/education/instructors-manual-conductivity-11.htm.
Norinobu Yonehara et al, "Chloride content in distilled water and chloride contamination from atmosphere; Application of freeze concentration", Bunseki Kagaku, 1981, vol. 30, No. 9, pp. 617-619 (3 pages total).
"Demineralised Water in Boiler Feed Water Treatment Applications", EWT Water Technology, 2018, pp. 1-4 (4 pages total), Retrieved from http://www.ewt-wasser.de/en/knowledge/demineralised-water.html.
International Search Report for PCT/JP2019/050314 dated Feb. 18, 2020 [PCT/ISA/210].

* cited by examiner

Fig. 1(A)   Preparation
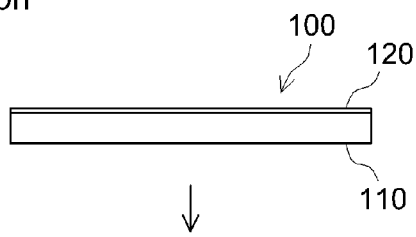
Fig. 1(B)   Application
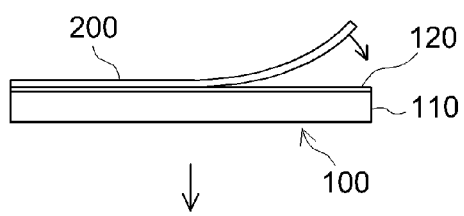
Fig. 1(C)   Protection
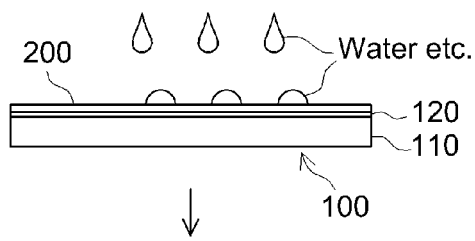
Fig. 1(D)   Removal
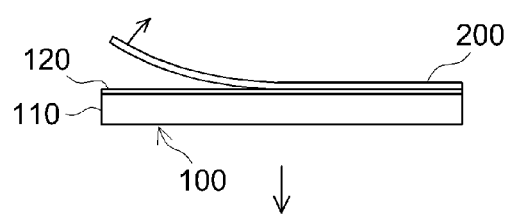
Fig. 1(E)   Assembly
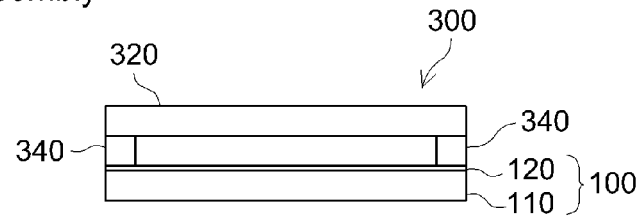

[Fig. 2]

METHOD FOR PREPARING PRESSURE-SENSITIVE ADHESIVE COMPOSITION, METHOD FOR PRODUCING PROTECTIVE SHEET AND METHOD FOR PRODUCING GLASS UNIT

TECHNICAL FIELD

The present invention relates to methods for producing a pressure-sensitive adhesive composition, a protective sheet and a glass unit.

This application is a National Stage of International Application No. PCT/JP2019/050314 filed Dec. 23, 2019, claiming priority based on Japanese Patent Application No. 2018-246231 filed Dec. 27, 2018, the entire content thereof is incorporated herein by reference.

BACKGROUND ART

In processing and transporting various articles, in known techniques to prevent damage (scratches, contamination, corrosion, etc.) of their surfaces, protective sheets are bonded to the surfaces for protection. The objects to be protected vary widely. For instance, protective sheets are used on glass plates bearing Low-E (Low-Emissivity) layers (or Low-E glass plates) as well. Low-E glass plates are preferably used as building materials such as window glass because of the effects of the Low-E layers to improve the efficiency to cool down and heat up indoor spaces. In producing a Low-E glass plate, usually, until a Low-E glass plate and another glass plate are assembled into a pair-glass (e.g. dual-pane glass) with the Low-E layer surface on the inside, a protective sheet is applied via its adhesive layer to the Low-E layer surface which will be otherwise left exposed. This protects the Low-E layer from damage, wearing, degradation, corrosion, etc. Conventional art documents related to methods for producing glass units include Patent Documents 1 and 2.

For the surface protection, as a removable bonding means, pressure-sensitive adhesive (or PSA; the same applies hereinafter) can be preferably used. In general, pressure-sensitive adhesive has characteristics of being in a soft solid (viscoelastic) state in a room temperature range and easily adhering to adherend under some pressure. A surface protective sheet using PSA typically has a PSA layer on one face of a substrate sheet formed of a material such as resin and is constituted so as to achieve a protection purpose when the PSA layer is applied to an adherend (an object to be protected). Conventional art documents disclosing PSA sheets usable as surface protective sheets include Patent Documents 3 to 6. Patent Document 3 discloses a surface protective sheet that protects the surface of a metal plate while it is being drawn. Patent Document 4 discloses a surface protective sheet for optical film such as polarizing plates. Patent Document 5 relates to a surface protective sheet for a self-cleaning hydrophilic coated plate. Patent Document 6 is directed to easy removal of a surface protective sheet for metal plates on which top coats are formed and to reduction of the degree of contamination caused by it.

CITATION LIST

Patent Literature

[Patent Document 1] European Patent No. 2150669
[Patent Document 2] WO 2016/139318
[Patent Document 3] Japanese Patent Application Publication No. 2017-186517
[Patent Document 4] Japanese Patent No. 5719194
[Patent Document 5] Japanese Patent Application Publication No. 2012-131976
[Patent Document 6] Japanese Patent No. 3571460

SUMMARY OF INVENTION

Solution to Problem

Protection of a Low-E glass plate with the protective sheet can block not only physical damage such as breakage and abrasion, but also the entrance of water, moisture, etc. Low-E glass plates are protected with protective sheets when exposed to external environments and subjected to processes such as processing and washing. Accordingly, protective sheets are required to have properties to prevent degradation and corrosion of Low-E layers in such environments. However, harsh conditions can be expected for Low-E glass plate transportation, storage and so on; and it is not easy to prevent the Low-E layer's degradation and corrosion to satisfactory levels.

Because of these circumstances, by the present inventors, a study has been conducted about better preventing degradation and corrosion in Low-E glass plates; and the occurrence of degradation and corrosion has been found despite of sufficient protection using protective sheets. The study has resulted in finding that the protective sheet itself can cause degradation and corrosion of Low-E layers and the present invention has been made upon investigation of the cause. In other words, an objective of this invention is to provide a method for preparing a PSA composition in order to protect Low-E glass plates from degradation and corrosion. Another related objective of this invention is to provide a method for producing a Low-E glass plate protective sheet using the PSA composition as well as a method for producing a glass unit.

Solution to Problem

The present Description provides a method for preparing a PSA composition for Low-E glass plate protection. The method comprises a step of obtaining an aqueous liquid and a step of obtaining a polymer-containing liquid comprising the aqueous liquid and a polymer. Here, the aqueous liquid satisfies at least one of the following: (a) having an electrical conductivity below 300 µS/cm and (b) having a chloride ion concentration ([Cl⁻]) below 35 µg/mL.

The aqueous liquid such as water used in preparation of PSA is later removed from the PSA by drying, curing, etc., during PSA layer formation. However, trace components in the aqueous liquid can cause degradation and corrosion (or comprehensively referred to as "erosion" hereinafter) of the PSA. Accordingly, to prepare a PSA composition, this method uses an aqueous liquid that satisfies (a) having an electrical conductivity below 300 µS/cm, (b) having a chloride ion concentration below 35 µg/mL, or both. This limits contamination with erosive trace components and prevents erosion due to the PSA of the protective sheet. In particular, when the aqueous liquid has water quality with an electrical conductivity below 300 µS/cm, erosion can be prevented without controlling the chloride ion concentration. With respect to an aqueous liquid having an electrical conductivity of 300 µS/cm or higher, water treatment can be carried out to reduce it to below 300 µS/cm; however, such a process lowers the productivity, leading to a cost increase. With respect to such a highly conductive aqueous liquid, an aqueous liquid with a chloride ion concentration below 35 μg/mL is selected for use. From the results of the working examples described later, among all ions in an aqueous liquid, chloride ions are considered a primary contributor to erosion. Thus, by limiting the chloride ion concentration to below the prescribed concentration, erosion can be prevented. In other words, the method can bring about a PSA composition capable of preventing erosion of Low-E glass plates.

In a typical embodiment of the art (PSA composition preparation method, protective sheet production method and glass unit production method) disclosed herein, the method comprises a step of obtaining the polymer by carrying out emulsion polymerization in the presence of the aqueous liquid. In an embodiment using the aqueous liquid as the polymerization water (water as the polymerization medium), the effect of the art disclosed herein can be preferably obtained.

In a preferable embodiment of the art disclosed herein, the PSA composition is a water-dispersed PSA composition in which the polymer is dispersed at least partially in the aqueous liquid. From the standpoint of the environmental sanity, etc., water-dispersed PSA compositions are more desirable than solvent-based PSA compositions in which adhesive components are dissolved in organic solvents. In this embodiment, the effect of the art disclosed herein can be preferably obtained.

In a preferable embodiment of the art disclosed herein, the chloride ion concentration of the aqueous liquid is below 15 μg/mL. With the use of the aqueous liquid having such a low chloride ion concentration, it is possible to obtain a PSA composition that can better prevent erosion.

In a preferable embodiment of the art disclosed herein, the aqueous liquid has an electrical conductivity of 5 μS/cm or higher. Although a suitable water treatment technology can decrease the electrical conductivity of water and the like, it may lead to increases in cost and time, not serving as a realistic solution in view of the productivity. From this viewpoint, for practical purposes, the aqueous liquid is allowed to have an electrical conductivity of 5 μS/cm or higher; and erosion prevention and productivity can be combined, well-balanced.

In a preferable embodiment of the art disclosed herein, the aqueous liquid has a total concentration of nitrate, sulfate and chloride ions below 50 μg/mL. With the use of such an aqueous liquid, it is possible to obtain a PSA composition that can better prevent erosion.

In a preferable embodiment of the art disclosed herein, the aqueous liquid has a ratio ($A_{Cl}$/C) of chloride ion concentration $A_{Cl}$ (μg/mL) to electrical conductivity C (μS/cm) of ⅕ or lower. In view of the productivity, it can be advantageous to relatively reduce chloride ions among all ions with the $A_{Cl}$/C ratio at or below ⅕.

In a preferable embodiment of the art disclosed herein, the PSA composition is an acrylic PSA composition comprising an acrylic polymer as the polymer or a rubber-based PSA composition comprising a rubber-based polymer as the polymer.

The present Description provides a method for producing a Low-E glass plate protective sheet. The method comprises a step of obtaining a PSA composition by a method disclosed herein and a step of forming a PSA layer from the PSA composition. The use of this method brings about a protective sheet that can prevent erosion of Low-E glass plates.

The present Description also provides a method for producing a glass unit. The method comprises a step of obtaining a Low-E glass plate having a glass substrate and a Low-E layer placed on the glass substrate; a step of applying a protective sheet produced by a method disclosed herein to the Low-E layer surface of the Low-E glass plate; an optional step of subjecting the Low-E glass plate with the protective sheet adhered thereon to at least one process selected from the group consisting of transportation, storage, processing, washing and handling; a step of removing the protective sheet from the Low-E glass plate; and a step of assembling a glass unit using the Low-E glass plate.

According to the method, because of the presence of the protective sheet, risks of degradation and corrosion as well as damage and wear can be avoided for Low-E glass plates during transportation, storage, processing such as cutting, washing such as water wash, various handling processes, etc. In particular, because the aqueous liquid used in the protective sheet preparation has an electrical conductivity below the prescribed value or a chloride ion concentration below the prescribed value, erosion of a Low-E glass plate covered with the protective sheet can be prevented while a glass unit is being produced. According to the method, glass units can be efficiently produced while preventing erosion of Low-E glass plates.

BRIEF DESCRIPTION OF DRAWINGS

FIG. 1(A) to FIG. 1(E) show a schematic diagram illustrating an embodiment of the glass unit production method.

DESCRIPTION OF EMBODIMENTS

Figure 2:
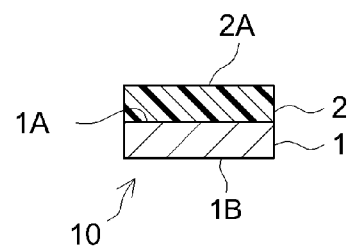
FIG. 2 shows a cross-sectional diagram schematically illustrating an embodiment of the protective sheet.

Preferred embodiments of the present invention are described below. Matters necessary to practice this invention other than those specifically referred to in this description can be understood by a person skilled in the art based on the disclosure about implementing the invention in this description and common technical knowledge at the time of application. The present invention can be practiced based on the contents disclosed in this description and common technical knowledge in the subject field.

<Method for Preparing PSA Composition>

The PSA composition preparation method disclosed herein is characterized by using an aqueous liquid that satisfies at least (a) having an electrical conductivity below 300 μS/cm or (b) having a chloride ion concentration below 35 μg/mL. According to the method, it is possible to obtain a PSA composition that can prevent erosion in a Low-E layer. Such a PSA composition is particularly preferably used for protection of Low-E glass plates.

(Obtaining of Aqueous Liquid)

The PSA composition preparation method disclosed herein includes a step of obtaining the aqueous liquid. The aqueous liquid satisfying the (a) and/or (b) can be obtained by selecting, upon analysis if necessary, an aqueous liquid that has a desirable electrical conductivity and/or a chloride ion concentration among raw water including surface water, groundwater (possibly well water), tap water and treated water obtained upon known water treatment.

In a preferable embodiment, the aqueous liquid is obtained by subjecting an aqueous liquid (untreated aqueous liquid) such as raw water to a known treatment such as filtration, membrane separation, ion exchange, distillation, physical adsorption, and electrolysis. In particular, a more preferable treatment is membrane separation using a reverse osmosis membrane, nanofiltration membrane, ultrafiltration membrane, precision filtration membrane and the like with the reverse osmosis membrane being particularly preferable. When ion exchange is selected as the water treatment method, cation exchange (using cation exchange resin), anion exchange (using anion exchange resin) or a mixed bed thereof can be used; however, from the standpoint of removing anions (typically chloride ions) as primary contributors to erosion, anion exchange is preferably selected when using ion-exchanged water. In this embodiment, the untreated aqueous liquid used in the treatment process has an electrical conductivity of 300 µS/cm or higher and a chloride ion concentration of 35 µg/mL or greater. The treatment system is not particularly limited and a known or commonly used treatment system can be used. The treatment conditions can be suitably set in accordance with the untreated water, system and required water quality without particular limitations.

(Preparation of PSA Composition)

Subsequently, the aqueous liquid obtained as described above is used to obtain a polymer-containing liquid that comprises a polymer (which can be the base polymer described later) as an adhesive component. In other words, the method disclosed herein includes a step of obtaining a polymer-containing liquid comprising the aqueous liquid and a polymer. The usage of the aqueous liquid is not particularly limited as long as it is used for preparing a PSA composition. The timing for using it is not particularly limited, either. The aqueous liquid is also referred to as water for PSA composition preparation (or PSA composition prep water). The prep water can be water used in the polymerization (hereinafter as "polymerization water"), water added after the polymerization (water added afterwards), etc. The resulting polymer containing liquid can be used as the PSA composition or it can be further mixed with additives to prepare the PSA composition. The PSA composition obtained using the aqueous liquid can be a water-dispersed PSA composition in which the polymer is at least partially (typically entirely) dispersed in the aqueous liquid. The particulars of the polymer (typically the base polymer) used in the PSA composition as well as the particulars of the PSA composition and other matters related to preparation of the PSA composition are described later.

In a typical embodiment, the aqueous liquid is used as polymerization water in emulsion polymerization. In other words, the PSA composition preparation method disclosed herein may include a step of obtaining a polymer by carrying out emulsion polymerization in the presence of the aqueous liquid. The particulars of the polymer obtained by emulsion polymerization are described later.

(Properties of Aqueous Liquid)

With respect to the aqueous liquid used in the preparation of PSA composition, it is not essential to have an electrical conductivity below 300 ρS/cm as long as chloride ions in the aqueous liquid are limited to the prescribed quantity. Thus, in an embodiment, the electrical conductivity of the aqueous liquid is not particularly limited. On the other hand, because the electrical conductivity correlates with the ion concentration in the aqueous liquid, from the standpoint of limiting the erosive ion concentration, the electrical conductivity of the aqueous liquid in another embodiment is preferably below 300 µS/cm, more preferably below 200 µS/cm, yet more preferably below 100 µS/cm, or particularly preferably below 50 µS/cm (e.g. below 30 µS/cm, or even below 15 µS/cm). Such an aqueous liquid can be used as an anti-erosion medium without quantifying chloride ions which are considered a primary contributor to erosion.

The minimum electrical conductivity of the aqueous liquid used can be the theoretical lower limit (around 0.05 µS/cm at room temperature). In view of the productivity, allowable level for practical use, etc., it can be about 1 µS/cm or higher, about 5 µS/cm or higher, about 10 µS/cm or higher, about 50 µS/cm or higher (e.g. about 100 µS/cm or higher, or even about 200 µS/cm or higher).

The electrical conductivity of the aqueous liquid is determined at room temperature (23° C.), using a commercial electrical conductivity (EC) meter. In particular, it is determined by the method described later in Examples.

The aqueous liquid used in the preparation of PSA composition is preferably limited in chloride ion concentration. In particular, when the aqueous liquid has an electrical conductivity of 300 µS/cm or higher, it has a chloride ion concentration below 35 µg/mL. This can bring about anti-erosion effects. While no particular limitations are imposed, the chloride ion concentration in the aqueous liquid is preferably below 35 µg/mL even when the electrical conductivity is below 300 µS/cm. In this case, the aqueous liquid used in the preparation of PSA composition disclosed herein comprises less than 35 µg/mL of chloride ions regardless of electrical conductivity.

The chloride ion concentration in the aqueous liquid is suitably below 35 µg/mL (e.g. below 30 µg/mL), preferably below 25 µg/mL, more preferably below 20 µg/mL, yet more preferably below 15 µg/mL, particularly preferably below 10 µg/mL, most preferably below 5 µg/mL, or possibly even below 3 µg/mL (e.g. below 1 µg/mL). The minimum chloride ion concentration in the aqueous liquid is ideally 0 µg/mL; however, in view of the productivity, allowable level for practical use, etc., it can be about 1 µg/mL or greater, or even about 3 µg/mL or greater.

In a preferable embodiment, the aqueous liquid has a ratio (Ac/C) of chloride ion concentration $A_{Cl}$ (µg/mL) to electrical conductivity C (µS/cm) of about ⅕ or lower. The $A_{Cl}/C$ ratio at or below the prescribed value indicates that the chloride ion concentration is relatively low among all ions. When the Ac/C ratio is about ⅕ or lower, prevention of erosion can be preferably combined with productivity. The Ac/C ratio is more preferably about ⅛ or lower, about 1/10 or lower, or about 1/15 or lower. The minimum $A_{Cl}/C$ ratio is not particularly limited and can be about 1/30 or higher (e.g. 1/20 or higher).

From the standpoint of preventing erosion, the aqueous liquid used in the preparation of PSA composition is desirably limited in sulfate ion concentration. The sulfate ion concentration in the aqueous liquid is typically about 50 µg/mL or less, suitably about 35 µg/mL or less (e.g. about 25 µg/mL or less), preferably about 15 µg/mL or less, more preferably about 5 µg/mL or less, or yet more preferably about 2 µg/mL or less (e.g. about 1 µg/mL or less). The minimum sulfate ion concentration in the aqueous liquid is ideally 0 µg/mL; however, in view of the productivity, allowable level for practical use, etc., it can be about 10 µg/mL or greater, or even about 20 µg/mL or greater.

From the standpoint of preventing erosion, the aqueous liquid used in the preparation of PSA composition is desirably limited in nitrate ion concentration. The nitrate ion concentration in the aqueous liquid is typically about 30 µg/mL or less, suitably about 20 µg/mL or less (e.g. about 10 µg/mL or less), preferably about 7 µg/mL or less, more preferably about 5 µg/mL or less, or yet more preferably about 2 µg/mL or less (e.g. about 1 µg/mL or less). The minimum nitrate ion concentration in the aqueous liquid is ideally 0 µg/mL; however, in view of the productivity, allowable level for practical use, etc., it can be about 1

μg/mL or greater, about 3 μg/mL or greater, or even about 5 μg/mL or greater (e.g. 10 μg/mL or greater).

In the aqueous liquid used in the preparation of PSA composition, the total concentration of nitrate, sulfate and chloride ions is suitably about 80 μg/mL or less. By limiting the total concentration of these erosive ion species, erosion can be more assuredly prevented. The total concentration of the three ion species is preferably below 50 μg/mL, more preferably below 30 μg/mL, yet more preferably below 15 μg/mL, or possibly about 10 μg/mL or less (e.g. about 5 μg/mL or less). The minimum total concentration of the three ion species in the aqueous liquid is ideally 0 μg/mL; however, from the standpoint of the productivity, allowable level for practical use, etc., it can be about 1 μg/mL or greater, about 5 μg/mL or greater, or even about 10 μg/mL or greater (e.g. 30 μg/mL or greater).

From the standpoint of preventing erosion, in the art disclosed herein, among the ions in the aqueous liquid, it is presumably important to limit the anion concentration (typically the chloride ion concentration). On the other hand, the cation concentration in the aqueous liquid is not particularly limited. In an embodiment, the cation concentration in the aqueous liquid can be in the range where the electrical conductivity is below 300 μS/cm. For instance, the concentration of calcium and magnesium ions removed by a general water-softening process is not particularly limited. The concentration of calcium and magnesium ions in the aqueous liquid used in the preparation of PSA composition can be 1 μg/mL or greater, about 10 μg/mL or greater, or even 20 μg/mL or greater.

The concentrations of chloride ions, sulfate ions, nitrate ions, calcium ions and magnesium ions in the aqueous liquid can be determined by ion chromatography using the respective commercial standard ion solutions. In particular, they are determined by the method described later in Examples.

The aqueous liquid disclosed herein refers to a liquid whose primary component is water ($H_2O$) and it may include an organic solvent such as alcohol at a lower percentage than that of water. In typical, a liquid comprising more than 50% water by volume is used as the aqueous liquid. The water content of the aqueous liquid is typically about 90% by volume or higher, or suitably about 99% by volume or higher (e.g. 99.9% by volume or higher).

<Method for Producing Protective Sheet>

The art disclosed herein includes a method for producing a protective sheet. The protective sheet production method comprises a step of obtaining a PSA composition by the preparation method described above and a step of forming a PSA layer from the resulting PSA composition. Because PSA-caused erosion can be prevented, the protective sheet having such a PSA layer is particularly preferably used for protection of Low-E glass plates. When the protective sheet has a substrate layer and a PSA layer, the method for producing the protective sheet includes a step of providing a PSA layer to one face of the substrate layer.

The PSA layer can be formed based on a known method for forming PSA layers in PSA sheets. For instance, it is preferable to employ a direct method where the PSA composition is directly provided (typically applied) to the substrate and allowed to cure to form a PSA layer. Alternatively, it is also possible to employ a transfer method where the PSA composition is provided to a releasable surface (release face) and allowed to cure to form a PSA layer on the surface and the resulting PSA layer is transferred to the substrate. As the release face, the surface of a release liner, the substrate's backside treated with release agent, or the like can be used.

While the PSA layer is typically formed in a continuous form, it can be formed in a regular or random pattern of dots, stripes, etc.

The PSA composition can be applied, using a heretofore known coater, for instance, a gravure roll coater, reverse roll coater, kiss roll coater, dip roll coater, die coater, bar coater, knife coater and spray coater. Alternatively, the PSA composition can be applied by immersion, curtain coating, etc. From the standpoint of accelerating the crosslinking reaction, increasing the productivity, etc., the PSA composition is preferably dried with heat. The drying temperature is possibly, for example, 40° C. to 150° C. or preferably 50° C. to 130° C. (e.g. 60° C. to 100° C.). After dried, the PSA composition can be allowed to further age for purposes such as adjusting the distribution or migration of components in the PSA layer, advancing the crosslinking reaction, and lessening the strain possibly present in the substrate and the PSA layer.

<Glass Unit Production Method>

The glass unit production method disclosed herein comprises a step (A) of obtaining a Low-E glass plate comprising a glass substrate and a Low-E layer placed on the glass substrate; a step (B) of applying a protective sheet to the Low-E layer surface of the Low-E glass plate; an optional step (C) of subjecting the Low-E glass plate with the protective sheet adhered thereon to at least one process selected from the group consisting of transportation, storage, processing, washing and handling; a step (D) of removing the protective sheet from the Low-E glass plate; and a step (E) of assembling a glass unit using the Low-E glass plate. In this method, the protective sheet (or surface-protective sheet) disclosed herein is used. Further description is provided below while referring to FIG. 1(A) to FIG. 1(E).

First, in the step (A), as shown in FIG. 1(A), a Low-E glass plate 100 having a glass substrate 110 and a Low-E layer 120 placed on the glass substrate 110 is obtained. Low-E glass plate 100 is obtained by forming Low-E layer 120 on one face of glass substrate 110. The Low-E layer comprises a metal layer, an oxide layer such as a metal oxide layer, and a nitride layer such as silicon nitride; usually has a multi-layer structure; and is formed by a known or conventionally-used method such as sputtering. The materials forming the respective layers in the Low-E layer include $TiO_2$, $ZrO_2$, $Si_xN_y$, $ZnO_x$, Ag, $NiCrO_x$, and $SnO_2$. As an infrared-reflective layer, a Ag layer is preferably used. In the Low-E layer according to an embodiment, the Ag layer is typically present between $ZnO_x$ layers. The material of the Low-E layer's outermost surface (to which the protective sheet is applied) is often an oxide such as $TiO_2$, $ZrO_2$, $ZnO_x$, $NiCrO_x$ and $SnO_2$ or a nitride such as $Si_xN_y$; it typically is not a metal such as Ag. Depending on the required properties, the Low-E layer may have a multi-layer structure with 5 or more layers, for instance, 10 or more layers, or even 15 or more layers. The thickness of each layer is not particularly limited. It is usually 0 to 1000 Å, or suitably about 10 Å to 700 Å, for instance, about 30 Å to 300 Å. The thickness (overall thickness) of the Low-E layer can be about 10 nm to 1000 nm (e.g. about 50 nm to 500 nm). The size of the glass substrate is not particularly limited with one side (width) being, for instance, about 1 m or greater, or about 2 m or greater. Lately, pieces having surface areas larger than 2.6 m at one side, or even as large as about 3 m or greater at one side are used.

In the step (B), as shown in FIG. 1(B), a protective sheet 200 is applied to the surface of Low-E layer 120 formed on glass substrate 110. Protection sheet 200 is typically applied to the surface in a removable manner. Here, "(to be) applied in a removable manner" means adhesion whose eventual release is intended or expected; in many cases, it refers to adhesion such that the adherend can maintain its surface condition prior to the adhesion basically intact after the protective sheet (PSA sheet) is removed. From the standpoint of the protection, the size of protective sheet 200 is preferably about the same as the surface of Low-E layer 120. Two or more protective sheets may be partially layered to cover the surface to be protected. By covering the surface of Low-E layer 120 with protective sheet 200, the Low-E layer 120 can be prevented or inhibited from erosion, etc.

After the step (B), as the step (C), with respect to the Low-E glass plate having the protective sheet applied thereon, at least one process may be optionally carried out, selected from the group consisting of transportation, storage, processing, washing and handling. The processing may be the sort of cutting and edge seaming of the Low-E glass plate having the protective sheet applied thereon. The cutting means and the cut size are suitably selected in accordance with the purpose and are not particularly limited. The protective sheet may be left on the Low-E layer surface even after the Low-E glass plate is cut. The cut Low-E glass plate is typically washed with water, etc. In the washing step, in addition to the water, a detergent (including surfactant) may be optionally used. During the transportation, storage, processing such as cutting, washing such as a water wash and various kinds of handling, as shown in FIG. 1(C), by the presence of protective sheet 200 thereon, the Low-E layer 120 is protected from damage, wearing, degradation, corrosion, etc.

Subsequently, in the step (D), protective sheet 200 is removed from Low-E glass plate 100 (FIG. 1(D)). The protective sheet 200 is removed from Low-E glass plate 100 (adherend) after achieving the protection purpose. Low-E glass plate 100 from which protective sheet 200 is removed is usually heated and annealed in an oven. Subsequently, as shown in FIG. 1(E), using the Low-E glass plate 100, a glass unit 300 is fabricated (the step (E)). Glass unit 300 is typically a heat-blocking or thermally-insulating glass unit, which can be fabricated by obtaining a pair of glass plates of which at least one is a Low-E glass plate and assembling a pair-glass (e.g. dual-pane glass) with the surface of Low-E layer 120 of Low-E glass plate 100 on the inside. Numbers 320 and 340 in FIG. 1(E) represent another glass plate forming the glass unit 300 and a spacer, respectively. Spacer 340 is placed between Low-E glass plate 100 and another glass plate 320 to create an open space between glass plates 100 and 320. In the method disclosed herein, in addition to the protective sheet, known or conventionally-used powder or coating liquid may be used together.

<Surface Protection Method>

The surface protection method disclosed herein uses the protective sheet (or surface protective sheet) disclosed herein and typically relates to a method for protecting the surface of a Low-E glass plate. The protection method disclosed herein is characterized by comprising a step of applying the protective sheet to the surface of the Low-E glass plate (an application step).

The surface protection method disclosed herein may further comprise a step of removing the protective sheet from the Low-E glass plate (a removal step). Between the application step and the removal step, for the article having the protective sheet applied thereon, the method may optionally include at least one process selected from the group consisting of transporting, storing, processing, washing and handling.

A favorable example of the surface protection method disclosed herein is as described earlier regarding the glass unit production method; the application step and the removal step of this method correspond to the steps (B) and (D) in the production method, respectively. Other matters in the surface protection method are not particularly limited. They can be understood by an ordinarily-skilled person in consideration of the description of the glass unit production method. Thus, details are omitted here.

<Constitution of Protective Sheet>

As used herein, the term "PSA" refers to, as described earlier, a material that exists as a soft solid (a viscoelastic material) in a room temperature range and has a property to adhere easily to an adherend with some pressure applied. As defined in C. A. Dahlquist, "*Adhesion: Fundamental and Practice*' (McLaren & Sons (1966), P. 143), the PSA referred to herein is a material that has a property satisfying complex tensile modulus $E^* $ (1 Hz)$<10^7$ dyne/cm$^2$ (typically, a material that exhibits the described characteristics at 25° C.).

The concept of protective sheet herein may encompass so-called PSA sheet, PSA tape, PSA labels, PSA film, etc. The protective sheet disclosed herein can be in a roll or in a flat sheet. Alternatively, the protective sheet may be processed into various shapes.

The protective sheet disclosed herein typically has a PSA layer on a substrate layer (support substrate). FIG. 2 shows a cross-sectional structure of the protective sheet according to an embodiment. Protective sheet 10 comprises a PSA layer 2 provided on the first face 1A of a substrate-layer sheet 1. When used, it is applied to an adherend over the face 2A of PSA layer 2. When protective sheet 10 is used as a surface protective sheet, the face 2A of PSA layer 2 is applied to an object to be protected. The back face 1B (on the reverse side of the first face 1A) of substrate layer 1 is also the back face of protective sheet 10, forming the outer surface of protective sheet 10. Prior to use (i.e. before applied to the adherend), protective sheet 10 can be in a form where the face 2A (adhesive face, i.e. the bonding surface to the adherend) of PSA layer 2 is protected with a release liner (not shown in the drawing) having a release face at least on the PSA layer side. Alternatively, protective sheet 10 may be in a form where, with the second surface (back face) 1B of substrate layer 1 being a release face, protective sheet 10 is wound in a roll so that the back face comes in contact with the PSA layer 2 to protect the surface (adhesive face) 2A.

As the release liner, commonly-used release paper and the like can be used without particular limitations. For instance, a release liner having a release layer on a surface of a liner substrate such as plastic film and paper, a release liner formed from a low-adhesive material such as fluorinated polymer (polytetrafluoroethylene, etc.) and polyolefinic resin, and the like can be used. The release layer can be formed by subjecting the liner substrate to surface treatment with various release agents including silicone-based, long-chain alkyl-based, and fluorinated kinds as well as molybdenum sulfide.

The protective sheet disclosed herein is not particularly limited in width. For instance, by using a protective sheet having a width of about 1 m or greater or even about 1.5 m or greater, a Low-E glass plate having a relatively large surface area can be efficiently protected. In a preferable embodiment, the protective sheet has a width of about 2 m or greater. With such a broad protective sheet, a large Low-E glass plate can be protected with a single sheet or a few sheets. For protecting the Low-E glass plate, it is preferable to use a protective sheet having a width of, for instance, about 2.5 m or greater, or even about 2.6 m or greater. The protective sheet's width can be greater than 2.6 m (e.g. 3 m or greater). The maximum width of the protective sheet is not particularly limited. From the standpoint of the productivity, handling properties, etc., it is typically suitably about 5 m or less, for instance, possibly about 4 m or less.

The protective sheet disclosed herein can be specified by the plane (sheet face) having a long side and a short side. The long side is defined longer than the short side and the short side is defined shorter than the long side. For instance, the short side may orthogonally intersect the long side. The protective sheet's length direction coincides with the long side and the width direction orthogonally intersects the length direction. Accordingly, as used herein, the "width" is defined as the length (distance) in the direction orthogonal to the length direction. Long-length, belt-like and oblong protective sheets are typical examples of the protective sheet disclosed herein. While the long side extends almost linearly, the short side is not limited to a straight line and can be a curve, zigzag, etc. For instance, in a long protective sheet, the length (distance in the length direction) is equal to or greater than the width.

The thickness of the protective sheet disclosed herein is not particularly limited. From the standpoint of the handling properties, the lightness of weight, etc., it is usually suitably about 1000 µm or less (typically about 300 µm or less, e.g. about 150 µm or less). In an embodiment, the thickness of the protective sheet is preferably about 120 µm or less, more preferably about 100 µm or less, yet more preferably about 75 µm or less, or possibly, for instance, less than 60 µm. The thickness of the protective sheet can be typically greater than 20 µm, preferably greater than 30 µm, or more preferably greater than 40 µm, for instance, greater than 45 µm.

As used herein, the thickness of the protective sheet includes the thicknesses of the PSA layer and the substrate layer, but excludes the thickness of the release liner.

The thickness of the substrate layer constituting the protective sheet disclosed herein is not particularly limited. The thickness of the substrate layer can be, for instance, about 800 µm or less (typically about 250 µm or less). In an embodiment, the thickness of the substrate layer (typically, non-foamed resin film) is preferably about 150 µm or less, more preferably about 100 µm or less, or yet more preferably less than 65 µm, for instance, less than 55 µm. With decreasing thickness of the substrate layer, the protective sheet tends to exhibit greater conformability to the adherend shape while its lifting and peeling tend to be inhibited. From the standpoint of adherend protection and handling properties, etc., the thickness of the substrate layer can be typically about 10 µm or greater, preferably about 25 µm or greater, more preferably greater than about 30 µm, or yet more preferably greater than 40 µm, or possibly, for instance, greater than 45 µm.

No particular limitations are imposed on the thickness of the PSA layer constituting the protective sheet disclosed herein. From the standpoint of preventing adhesive transfer to the adherend, the thickness of the PSA layer is usually about 50 µm or less, suitably about 30 µm or less, preferably about 15 µm or less, or more preferably about 8 µm or less (e.g. less than 6 µm). In another embodiment, from the standpoint of the ease of removal, etc., the thickness of the PSA layer is suitably about 5 µm or less, about 4 µm or less, or possibly, for instance, 3 µm or less. From the standpoint of the adhesion, the thickness of the PSA layer is usually suitably about 0.5 µm or greater, preferably about 1 µm or greater, or more preferably greater than 2 µm. The thickness of the PSA layer may be greater than 3 µm, for instance, greater than 4 µm.

<PSA Layer>

While no particular limitations are imposed, the PSA layer forming the protective sheet disclosed herein suitably has a chloride ion amount of about 105 µg or less per gram of PSA (layer), determined by hot water extraction. This allows long-term prevention of erosion in the Low-E glass plate being protected. The chloride ion amount per gram of PSA (layer) is preferably about 100 µg or less, more preferably about 95 µg or less, yet more preferably about 90 µg or less, particularly preferably about 85 µg or less, or possibly about 75 µg or less (about 70 µg or less). The minimum chloride ion amount per gram of PSA (layer) is ideally 0 µg; however, from the standpoint of the productivity, allowable level for practical use, etc., it can be about 1 µg or greater, about 10 µg or greater, or even about 50 µg or greater. The chloride ion amount per gram of PSA (layer) is determined by the method shown below. Alternatively, it can also be determined as follows: chloride ions in the protective sheet and the substrate layer are quantified by hot water extraction; from the difference in chloride ion amount between the two, the chloride ion amount from the PSA layer is determined; and the resulting value is converted to a per unit PSA (layer) value.

[Chloride Ion Amount of PSA (Layer)]

The protective sheet subject to measurement is washed well with pure water, cut to a 200 cm$^2$ sized sheet area and the PSA is collected alone. The collected PSA is placed in a polypropylene (PP) container and weighed. 25 mL of pure water is added to the PP container. Using a drier, thermal extraction is carried out at 120° C. for one hour. With respect to the resulting extract, by the same method as the ion chromatography described later, chloride ions in the extract are quantified using a standard chloride ion solution to determine the chloride ion amount per gram of PSA used in the extraction.

The type of PSA forming the PSA layer disclosed herein is not particularly limited. The PSA layer may be formed from a PSA composition comprising, as the base polymer (the primary component among the polymers, i.e. a component accounting for 50% by weight or more), one, two or more species selected among various polymers (polymers as adhesive components or adhesive polymers), such as acrylic, polyester-based, urethane-based, polyether-based, rubber-based, silicone-based, polyamide-based, and fluorinated polymers. The art disclosed herein can be preferably made, for instance, as a protective sheet comprising an acrylic PSA layer or a rubber-based PSA layer.

The "acrylic PSA layer" here refers to a PSA layer comprising an acrylic polymer as the base polymer. Similarly, the "rubber based PSA layer" refers to a PSA layer comprising a rubber-based polymer as the base polymer. The "acrylic polymer" refers to a polymer whose primary monomer (the primary component among the monomers, i.e. a component that accounts for 50% by weight or more of the total amount of the monomers forming the acrylic polymer) is a monomer having at least one (meth)acryloyl group per molecule. Such a monomer may be referred to as an "acrylic monomer" hereinafter. As used herein, the "(meth)acryloyl group" comprehensively refers to acryloyl group and methacryloyl group. Similarly, the "(meth)acrylate" comprehensively refers to acrylate and methacrylate.

(Acrylic Polymer)

A preferable example of the acrylic polymer is a polymer of a starting monomer mixture that comprises an alkyl (meth)acrylate (or a monomer A hereinafter) and may further comprise another monomer (or a monomer B hereinafter) that is copolymerizable with the alkyl (meth)acrylate.

The acrylic polymer typically has a monomer unit composition corresponding to the monomer composition of the starting monomer mixture.

A preferable monomer A is an alkyl (meth)acrylate represented by the next general formula (1):

$$CH_2=C(R^1)COOR^2 \quad (1)$$

Here, $R^1$ in the formula (1) is a hydrogen atom or a methyl group. $R^2$ is an alkyl group having 1 to 20 carbon atoms. Hereinafter, such a range of the number of carbon atoms may be indicated as "$C_{1-20}$." From the standpoint of the polymerization reactivity, polymerization stability, etc., an alkyl (meth)acrylate wherein $R^2$ is a $C_{1-16}$ alkyl group is preferable, and an alkyl (meth)acrylate wherein $R^2$ is a $C_{1-12}$ (typically $C_{1-10}$, e.g. $C_{1-8}$) alkyl group is more preferable.

Examples of an alkyl (meth)acrylate with $R^2$ being a $C_{1-2}$ alkyl group include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, undecyl (meth)acrylate, lauryl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate, etc. These alkyl (meth)acrylates can be used solely as one species or in a combination of two or more species.

The art disclosed herein can be preferably implemented in an embodiment where the alkyl acrylate as the monomer A accounts for about 50% by weight or more (more preferably about 75% by weight or more, yet more preferably about 90% by weight or more, e.g. about 95% by weight or more) of the total monomer content. As the alkyl acrylate, an alkyl acrylate with $R^2$ in the formula (1) being a $C_{1-20}$ alkyl group is preferable and an alkyl acrylate with $R^2$ being a $C_{1-12}$ (more preferably $C_{1-10}$, particularly preferably $C_{1-8}$) alkyl group is more preferable. The art disclosed herein can also be preferably implemented in an embodiment where the alkyl acrylate has a $C_{2-8}$ (typically $C_{4-8}$) alkyl group for $R^2$ in the formula (1). For the alkyl acrylate, solely one species or a combination of two or more species can be used. When two or more species of alkyl acrylate are used, to adjust the acrylic polymer's Tg to the most adequate range, etc., an alkyl acrylate A1 with $R^2$ being a $C_{4-20}$ (more preferably $C_{4-10}$, or yet more preferably $C_{4-8}$) alkyl group and an alkyl acrylate A2 with $R^2$ being a $C_{1-3}$ (more preferably $C_{1-2}$, e.g. $C_2$) alkyl group can be used together. In this embodiment, the alkyl acrylate A1 to alkyl acrylate A2 weight ratio (A1:A2) is not particularly limited. It is usually about 5:95 to 95:5, or suitably about 10:90 to 90:10, for instance, about 15:85 to 85:15.

In a preferable embodiment, the monomers include one, two or more species of alkyl methacrylate as the monomer A. With the use of the alkyl methacrylate, the base polymer can be preferably designed so as to achieve desirable PSA hardness. As the alkyl methacrylate, an alkyl methacrylate with $R^2$ in the formula (1) being a $C_{1-10}$ alkyl group is preferable and an alkyl methacrylate with $R^2$ being a $C_{1-4}$ (more preferably $C_1$ or $C_{2-4}$) alkyl group is more preferable. The alkyl methacrylate can be preferably used in combination with an alkyl acrylate. When an alkyl methacrylate and an alkyl acrylate are used together, with one, two or more species of alkyl methacrylate (e.g. $C_{2-4}$ alkyl methacrylate) having a weight $C_{AM}$ and one, two or more species of alkyl acrylate having a weight $C_{AA}$, their ratio ($C_{AM}:C_{AA}$) is not particularly limited. In an embodiment, it is usually about 1:9 to 9:1, suitably about 2:8 to 8:2, preferably about 3:7 to 7:3, or more preferably about 4:6 to 6:4. In another embodiment, the ratio of the weight $C_{AM}$ of the alkyl methacrylate (e.g. $C_1$ alkyl methacrylate, i.e. methyl methacrylate (MMA)) in the total amount ($C_{AM}+C_{AA}$) of the alkyl (meth) acrylate is usually about 30% by weight or lower, suitably about 20% by weight or lower, preferably about 10% by weight or lower, or more preferably about 7% by weight or lower. On the other hand, the lower limit is usually about 0.1% by weight or higher, suitably about 1% by weight or higher, or preferably about 2% by weight or higher (e.g. about 3% by weight or higher).

The art disclosed herein can be implemented in an embodiment where the monomers are essentially free of an alkyl methacrylate as the monomer A. In an embodiment using an alkyl methacrylate, it can be implemented, for instance, in an embodiment free of a $C_{1-3}$ alkyl methacrylate (typically MMA).

In another preferable embodiment, the acrylic polymer is a polymer of a starting monomer mixture that comprises an alkyl acrylate (or a monomer $m_A$, hereinafter) having 4 to 9 alkyl carbon atoms and may further comprise other monomer(s) as necessary. The acrylic polymer can be synthesized by polymerizing a starting monomer mixture having the corresponding composition (monomer composition) by a known method.

Non-limiting examples of monomer $m_A$ include n-butyl acrylate (BA), n-hexyl acrylate, 2-ethylhexyl acrylate (2EHA), n-octyl acrylate, n-nonyl acrylate and isononyl acrylate (iNA). A preferable alkyl acrylate includes a $-(CH_2)_3-$ structure in the alkyl group and a more preferable alkyl acrylate includes a $-(CH_2)_4-$ structure in the alkyl group. Favorable examples of monomer $m_A$ include 2EHA, BA and iNA. For the monomer $m_A$, solely one species or a combination of two or more species can be used.

The amount of monomer $m_A$ used typically accounts for 40% by weight or more of the starting monomers used in the synthesis of acrylic polymer. From the standpoint of the flexibility and enhanced low-temperature properties of the PSA layer comprising the acrylic polymer, it is advantageous that the monomer composition includes at least 40% monomer $m_A$ by weight. From such a standpoint, the ratio of monomer $m_A$ is preferably 45% by weight or higher, or possibly 50% by weight or higher (e.g. above 50% by weight). When the monomer composition includes 99.9% or less monomer $m_A$ by weight, the PSA layer comprising the acrylic polymer is likely to have suitable cohesion. From such a standpoint, the ratio of monomer $m_A$ is preferably 95% by weight or lower, more preferably 90% by weight or lower, or possibly 85% by weight or lower. In an embodiment, the ratio of monomer $m_A$ can be below 80% by weight or even below 70% by weight (e.g. 65% by weight or lower).

The acrylic polymer in the art disclosed herein may have a monomer composition comprising a carboxy group-containing monomer (or a monomer $m_B$, hereinafter) as the monomer B. In other words, a monomer $m_B$ may be copolymerized in the acrylic polymer. The monomer m may be useful in introducing crosslinking points into the acrylic polymer and increasing the cohesive strength of the PSA layer comprising the acrylic polymer. The monomer $m_B$ may help enhance the anti-PSA-residue properties by increasing the tightness of adhesion (anchoring) between the acrylic polymer-containing PSA layer and the substrate layer. Examples of the carboxy group-containing monomer include ethylenically unsaturated monocarboxylic acids such as acrylic acid, methacrylic acid, crotonic acid, isocrotonic acid, carboxyethyl (meth)acrylate, carboxypentyl (meth)acrylate and 1-[2-(methacryloyloxy)ethyl] succinate; ethylenically unsaturated dicarboxylic acids such as maleic acid, fumaric acid, itaconic acid and citraconic acid, and anhydrides thereof (e.g. maleic anhydride, itaconic anhydride, etc.). These carboxy group-containing monomers can be used singly as one species or in a combination of two species.

When using a monomer $m_B$, the ratio of monomer $m_B$ in the monomer composition is not particularly limited. The ratio of monomer $m_B$ can be, for instance, 0.05% by weight or higher, or typically suitably 0.1% by weight or higher. From the standpoint of the polymerization stability and dispersion stability, it is preferably 0.5% by weight or higher, or more preferably 1% by weight or higher. From the standpoint of inhibiting an excessive increase in peel strength (adhesive strength), the ratio of monomer $m_B$ is suitably about 20% by weight or lower (preferably about 10% by weight or lower, typically about 7% by weight or lower), more preferably about 5% by weight or lower, or yet more preferably about 4% by weight or lower (e.g. 3% by weight or lower).

In the acrylic polymer in the art disclosed herein, for purposes such as adjusting the glass transition temperature (Tg) of the acrylic polymer, an alkyl (meth)acrylate (or a monomer $m_C$, hereinafter) may be copolymerized as the monomer A, the alkyl (meth)acrylate having 4 to 20 alkyl carbon atoms and having a homopolymer Tg of −50° C. or higher. Here, a monomer belonging to the monomer $m_A$ is not categorized as a monomer $m_C$. For the monomer $m_C$, solely one species or a combination of two or more species can be used. A preferable monomer $m_C$ has a homopolymer Tg in the range between −40° C. and +60° C. and a more preferable monomer $m_C$ in the range between −30° C. and +40° C. (e.g. between −20° C. and +30° C.). Non-limiting examples of a monomer $m_C$ that can be preferably used include n-butyl methacrylate (BMA), 2-ethylhexyl methacrylate and lauryl acrylate.

When using a monomer $m_C$, the ratio of monomer $m_C$ in the monomer composition is not particularly limited. The ratio of monomer $m_C$ can be, for instance, 1% by weight or higher, 5% by weight or higher, 10% by weight or higher, or even 15% by weight or higher. In an embodiment, from the standpoint of obtaining greater effect of monomer $m_C$, the ratio of monomer $m_C$ in the monomer composition can also be 20% by weight or higher, 25% by weight or higher, 30% by weight or higher, or even 35% by weight or higher (e.g. 40% by weight or higher). The ratio of monomer $m_C$ in the monomer composition can be below 60% by weight. From the standpoint of the flexibility and enhanced low-temperature properties, it is suitably about 55% by weight or lower (typically about 50% by weight or lower, e.g. about 45% by weight or lower). In some embodiments, the ratio of monomer $m_C$ can be below 30% by weight, below 20% by weight, or even below 10% by weight (e.g. below 5% by weight, or even below 1% by weight).

In the acrylic polymer in the art disclosed herein, as necessary, other monomer(s) (monomer $m_D$) can be copolymerized as the monomer A besides monomers $m_A$, $m_B$ and $m_C$. As the monomer $m_D$, among various monomers copolymerizable with monomer $m_A$, solely one species or a combination of two or more species can be used.

As the monomer $m_D$, for instance, it is possible to use an alkyl (meth)acrylate (monomer $m_{D1}$) represented by the formula (1) shown earlier (while excluding any species considered a monomer $m_A$ or monomer $m_C$). Specific examples of the alkyl (meth)acrylate that can be used as monomer $m_{D1}$ include methyl (meth)acrylate, ethyl (meth)acrylate, propyl (meth)acrylate and the like. For the monomer $m_{D1}$, solely one species or a combination of two or more species can be used.

Examples of compounds that can be used as the monomer $m_D$ may include a functional group-containing monomer (monomer B) such as those described below. These functional group-containing monomers may be useful for introducing crosslinking points into the acrylic polymer or for increasing the cohesive strength of the acrylic polymer.

Hydroxy group-containing monomers: e.g. hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxyauryl (meth)acrylate and (4-hydroxymethylcyclohexyl)methyl acrylate; unsaturated alcohols such as vinyl alcohol and allyl alcohol.

Amide group-containing monomers: e.g. (meth)acrylamide, N,N-dimethyl (meth)acrylamide, N,N-diethyl (meth)acrylamide, N,N-dimethylaminopropyl (meth)acrylamide, N-butyl (meth)acrylamide, N-methylol (meth)acrylamide, N-methylolpropane (meth)acrylamide, N-methoxymethyl (meth)acrylamide, N-butoxymethyl (meth)acrylamide and diacetone (meth)acrylamide;

Imide group-containing monomers: e.g. N-isopropylmaleimide, N-cyclohexylmaleimide, itaconimide;

Amino group-containing monomers: e.g. aminoethyl (meth)acrylate, N,N-dimethylaminoethyl (meth)acrylate, N,N-dimethylaminopropyl (meth)acrylate, t-butylaminoethyl (meth)acrylate;

Epoxy group-containing monomers: e.g. glycidyl (meth)acrylate, methylglycidyl (meth)acrylate, allyl glycidyl ether;

Cyano group-containing monomers: e.g. acrylonitrile, methacrylonitrile; Keto group-containing monomers: e.g. diacetone (meth)acrylamide, diacetone (meth)acrylate, vinyl methyl ketone, vinyl ethyl ketone, allyl acetoacetate, vinyl acetoacetate;

Monomers having nitrogen atom-containing rings: e.g. N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, N-(meth)acryloyl morpholine, N-(meth)acryloylpyrrolidone; Alkoxysilyl group-containing monomers: e.g. (3-(meth)acryloxypropyl) trimethoxysilane, (3-(meth)acryloxypropyl)triethoxysilane, (3-(meth)acryloxypropyl)methyldimethoxysilane, (3-(meth)acryloxypropyl)methyldiethoxysilane.

Other examples of the compound that can be used as the monomer $m_D$ include vinyl ester-based monomers such as vinyl acetate and vinyl propionate; aromatic vinyl compounds such as styrene, substituted styrenes (α-methylstyrene, etc.) and vinyltoluene; non-aromatic ring-containing (meth)acrylates such as cyclohexyl (meth)acrylate, t-butylcyclohexyl (meth)acrylate, cyclopentyl di(meth)acrylate and isobornyl (meth)acrylate; aromatic ring-containing (meth)acrylates such as aryl (meth)acrylates (e.g. phenyl (meth)acrylate, benzyl (meth)acrylate), aryloxyalkyl (meth)acrylate (e.g. phenoxyethyl (meth)acrylate), arylalkyl (meth)acrylate (e.g. benzyl (meth)acrylate); olefinic monomers such as ethylene, propylene, isoprene, butadiene and isobutylene; chlorine-containing monomers such as vinyl chloride and vinylidene chloride; isocyanate group-containing monomers such as 2-(meth)acryloxyethylisocyanate; alkoxy group-containing monomers such as methoxymethyl (meth)acrylate and ethoxyethyl (meth)acrylate; vinyl ether-based monomers such as methyl vinyl ether, ethyl vinyl ether and isobutyl vinyl ether.

Yet other examples of the compound that can be used as the monomer $m_D$ include polyfunctional monomers. Specific examples of polyfunctional monomers include compounds having two or more (meth)acryloyl groups per molecule such as 1,6-hexanediol di(meth)acrylate, ethylene glycol di(meth)acrylate, pentaerythritol di(meth)acrylate, trimethylolpropane tri (meth)acrylate, dipentaerythritol hexa (meth)acrylate and methylene bisacrylamide. When using such a polyfunctional monomer, its amount used is not particularly limited. It is usually suitably 2% by weight or less (more preferably 1% by weight or less) of the total monomer content.

The monomer $m_D$ is used in an amount of typically no more than 40% by weight of the monomer composition, preferably no more than 20% by weight, or more preferably no more than 10% by weight. The monomer $m_D$ may not be used. The art disclosed herein can be preferably practiced in an embodiment where the amount of monomer $m_D$ used is 0% or more and below 5% by weight of the monomer composition. Here, that the amount of monomer $m_D$ used is 0% by weight means that no monomer $m_D$ is used at least intentionally.

The ratio of monomer A (alkyl (meth)acrylate) in the total monomer content can be, but is not particularly limited to, for instance, about 50% by weight or greater; it is suitably about 60% by weight or greater, preferably about 70% by weight or greater, more preferably about 80% by weight or greater, or yet more preferably about 85% by weight or greater. With the inclusion of the monomer A in a prescribed amount, a protective sheet having desirable adhesive properties can be favorably obtained. The art disclosed herein can be preferably implemented, for instance, in an embodiment where the monomer A content in the total monomer content is about 90% by weight or greater. In an embodiment, the monomer A content can be about 95% by weight or greater, or even about 97% by weight or greater. The PSA composition comprising such an acrylic polymer as the base polymer can be advantageous from the standpoint of the weatherability of the PSA layer formed therefrom (and also the protective sheet having the PSA layer). In an embodiment using a monomer A and a monomer B together, from the standpoint of suitably obtaining the effects of the monomer B, the monomer A content in the total monomer content can be, for instance, 99.9% by weight or less; it is usually preferably 99.5% by weight or less, more preferably 99% by weight or less, or about 97% by weight or less (e.g. 95% by weight or less).

When an aforementioned functional group-containing monomer is copolymerized in the acrylic polymer, the ratio of the functional group-containing monomer to all the monomers forming the acrylic polymer is usually preferably about 0.1% by weight or higher (typically about 0.5% by weight or higher, e.g. about 1% by weight or higher), and preferably about 40% by weight or lower (typically about 30% by weight or lower, e.g. about 20% by weight or lower). When a hydroxy group-containing monomer is copolymerized with the acrylic monomer, from the standpoint of obtaining desirable cohesive strength, the ratio of hydroxy group-containing monomers to the total monomer content is usually suitably about 0.001% by weight or higher (typically about 0.01% by weight or higher, e.g. about 0.1% by weight or higher), preferably about 1% by weight or higher, or more preferably about 3% by weight or higher; it is preferably about 10% by weight or lower (typically about 7% by weight or lower, e.g. about 5% by weight or lower).

(Rubber-Based Polymer)

In another preferable embodiment, the PSA layer can be a rubber-based PSA layer. Examples of the base polymer include natural rubber; styrene-butadiene rubber (SBR); polyisoprene; butene-based polymer comprising a butene (1-butene or cis- or trans-2-butene) and/or 2-methylpropene (isobutylene) as the primary monomer(s); A-B-A block copolymer rubber and a hydrogenation product thereof, e.g. styrene-butadiene-styrene block copolymer rubber (SBS), styrene-isoprene-styrene block copolymer (SIS), styrene-isobutylene-styrene block copolymer rubber (SIBS), styrene-vinyl-isoprene-styrene block copolymers (SVIS), hydrogenated SBS (styrene-ethylene-butylene-styrene block copolymer (SEBS)), and hydrogenated SIS (styrene-ethylene-propylene-styrene block copolymers (SEPS)). These rubber based polymers can be used singly as one species or in a combination of two or more species.

(Tg of Base Polymer)

The Tg value of the PSA layer's base polymer (an acrylic polymer in case of an acrylic PSA layer being used) is not particularly limited in Tg. The Tg of the base polymer can be, for instance, about 0° C. or lower. In a preferable embodiment, the base polymer of the PSA layer has a Tg of about −5° C. or lower. According to a base polymer having such a Tg, a PSA layer that tightly adheres to adherend can be favorably formed. In an embodiment where the base polymer has a Tg of about −15° C. or lower (more preferably about −20° C. or lower, e.g. about −25° C. or lower), greater effects can be obtained. In another preferable embodiment, from the standpoint of the adhesion to adherends, the base polymer of the PSA layer has a Tg of about −35° C. or lower, more preferably about −40° C. or lower, or yet more preferably about −45° C. or lower (e.g. below −50° C., even about −52° C. or lower, or about −55° C. or lower). The Tg of the base polymer is usually suitably −70° C. or higher. From the standpoint of the cohesion of the PSA, etc., it is preferably about −65° C. or higher, more preferably −60° C. or higher, yet more preferably about −55° C. or higher (e.g. about −50° C. or higher), or possibly even about −35° C. or higher. The base polymer's Tg can be adjusted by suitably changing the monomer composition (i.e. the monomer species used in the synthesis of the polymer and their ratio).

In the present description, the Tg of a polymer refers to the value determined by the Fox equation based on the Tg values of homopolymers of the respective monomers forming the polymer and the weight fractions (copolymerization ratio by weight) of the monomers. As shown below, the Fox equation is a relational expression between the Tg of a copolymer and glass transition temperatures Tgi of homopolymers of the respective monomers constituting the copolymer.

$$1/Tg=\Sigma(Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of homopolymer of the monomer i.

For the glass transition temperatures of homopolymers used for determining the Tg, the values found in known documents are used. For instance, with respect to the monomers listed below, for the glass transition temperatures of their homopolymers, the following values are used:

2-ethylhexyl acrylate −70° C.
n-hexyl acrylate −65° C.
n-octylacrylate −65° C.
isononyl acrylate −60° C.
n-nonyl acrylate −58° C.
n-butyl acrylate −55° C.
ethyl acrylate −20° C.
lauryl acrylate 0° C.
2-ethylhexyl methacrylate −10° C.
methyl acrylate 8° C.
n-butyl methacrylate 20° C.
methyl methacrylate 105° C.
acrylic acid 106° C.
methacrylic acid 228° C.
vinyl acetate 32° C.
styrene 100° C.

With respect to the Tg values of homopolymers other than the examples listed above, the values given in *Polymer Handbook* (3rd edition, John Wiley & Sons, Inc., Year 1989) are used. With respect to a monomer for which two or more values are listed in the *Polymer Handbook*, the highest value is used. When no values are given in the *Polymer Handbook*, values obtained by the measurement method described in Japanese Patent Application Publication No. 2007-51271 are used.

(Synthesis of Base Polymer)

The method for obtaining the base polymer (e.g. an acrylic polymer) is not particularly limited. Known polymerization methods can be suitably employed, such as solution polymerization, emulsion polymerization, bulk polymerization, and suspension polymerization. Alternatively, it is also possible to employ photopolymerization involving irradiation of light such as UV (typically carried out in the presence of a photopolymerization initiator) and active energy ray irradiation polymerization such as radiation polymerization involving irradiation of radioactive rays such as β rays and γ rays. The base polymer (e.g. acrylic polymer) is typically obtained by emulsion polymerization of a starting monomer mixture having an aforementioned composition. As the monomer supply method in, for instance, emulsion polymerization, a suitable method can be employed among the all-at-once method where all the starting monomer mixture is supplied in one portion, gradual supply method, portion-wise supply method, etc. An emulsion of some or all of the monomers pre-mixed with aqueous liquid and a surfactant can be supplied to the polymerization vessel.

The polymerization temperature can be suitably selected in accordance with the monomer species, the solvent species, and the polymerization initiator species used, etc. The polymerization temperature is usually suitably about 20° C. or higher, preferably about 40° C. or higher, more preferably about 50° C. or higher; it can also be about 60° C. or higher, about 65° C. or higher, or even about 70° C. or higher. The polymerization temperature is usually suitably about 170° C. or lower (typically about 140° C. or lower), or preferably about 95° C. or lower (e.g. about 85° C. or lower). In emulsion polymerization, the polymerization temperature is preferably about 95° C. or lower (e.g. about 85° C. or lower).

Examples of the polymerization initiator include, but not limited to, azo-based initiators, peroxide-based initiators and redox-based initiators by the combination of a peroxide and a reducing agent. For the polymerization initiator, solely one species or a combination of two or more species can be used.

Examples of azo-based initiators include 2,2'-azobisisobutyronitrile, 2,2'-azobis[N-(2-carboxyethyl)-2-methylpropionamidine] hydrate, 2,2'-azobis(2-methylpropionamidine) disulfate salt, 2,2'-azobis(2-methylpropionamidine) dihydrochloride, 2,2'-azobis[2-(5-methyl-2-imidazolin-2-yl)propane] dihydrochloride and 2,2'-azobis(N,N'-dimethylene isobutylamidine) dihydrochloride.

Examples of the peroxide-based initiator include persulfates such as potassium persulfate and ammonium persulfate; benzoyl peroxide, t-butyl hydroperoxide, di-t-butyl peroxide, dicumyl peroxide, dilauroyl peroxide, di-n-octanoyl peroxide, di(4-methylbenzoyl) peroxide, t-butyl peroxybenzoate, t-butyl peroxyisobutyrate, t-hexyl peroxypivalate, t-butyl peroxypivalate, di(2-ethylhexyl) peroxydicarbonate, di(4-t-butylcyclohexyl) peroxydicarbonate, di-sec-butyl peroxydicarbonate, t-butyl peroxyneodecanoate, 1,1,3,3-tetramethyl butylperoxy-2-ethylhexanoate, 1,1-bis(t-butylperoxy)-3,3,5-trimethylcyclohexane, 1,1-bis(t-butylperoxy)cyclododecane, 1,1-bis(t-hexylperoxy)cyclohexane and hydrogen peroxide.

Examples of the redox-based initiator include a combination of a peroxide and ascorbic acid (combination of hydrogen peroxide and ascorbic acid, etc.), a combination of a peroxide and an iron (II) salt (combination of hydrogen peroxide and an iron (II) salt, etc.), and a combination of a persulfate salt and sodium hydrogen sulfite.

The polymerization initiator can be used in an amount suitably selected in accordance with the type of initiator, monomer species (monomer composition), polymerization conditions, etc. The amount of polymerization initiator used is typically about 0.0005 part to 1 part by weight to 100 parts by weight of the starting monomers; and it is suitably, for instance, in the range between about 0.001 part and 0.5 part by weight; preferably in the range between 0.002 part and 0.3 part by weight; and more preferably in the range between 0.005 part and 0.1 part by weight.

In the emulsion polymerization, as necessary, various heretofore known chain transfer agents (which can be considered also as a molecular weight-adjusting agent or polymerization degree-adjusting agent) can be used. For the chain transfer agent, solely one species or a combination of two or more species can be used. As the chain transfer agent, mercaptans can be preferably used, such as n-dodecyl mercaptan, t-dodecyl mercaptan, glycidyl mercaptan, 2-mercaptoethanol, mercaptoacetic acid, thioglycolic acid, 2-ethylhexyl thioglycolate and 2,3-dimercapto-1-propanol. When using a chain transfer agent, its amount used to 100 parts by weight of the total monomer content is, for instance, possibly about 0.01 to 1 part by weight, preferably 0.02 to 0.1 part by weight, or more preferably 0.03 to 0.07 part by weight. The art disclosed herein can be preferably practiced in an embodiment without use of a chain transfer agent.

The surfactant (emulsifier) used in emulsion polymerization is not particularly limited. Commonly-known anionic surfactants, nonionic surfactants and the like can be used. A surfactant having a radically polymerizable functional group can also be used. Hereinafter, the surfactant having a radically polymerizable functional group is referred to as a reactive (polymerizing) surfactant. In contrast to this, a general surfactant free of a radically polymerizable functional group may be referred to as a non-reactive (non-polymerizing) surfactant. For the surfactant, solely one species or a combination of two or more species can be used. The amount of surfactant is usually preferably about 0.1 part by weight or greater (e.g. about 0.5 part by weight or greater) to 100 parts by weight of the total monomer content; and it is preferably about 10 parts by weight or less (e.g. about 5 parts by weight or less) to 100 parts by weight of the total monomer content.

Examples of the non-reactive surfactant include anionic emulsifiers such as sodium lauryl sulfate, ammonium lauryl sulfate, sodium dodecyl benzene sulfonate, sodium polyoxyethylene lauryl sulfate, sodium polyoxyethylene alkyl ether sulfates, ammonium polyoxyethylene alkyl phenyl ether sulfates, sodium polyoxyethylene alkyl phenyl ether sulfates, and sodium polyoxyethylene alkyl sulfosuccinates; and non-ionic emulsifiers such as polyoxyethylene alkyl ethers, polyoxyethylene alkyl phenyl ethers, polyoxyethylene aliphatic acid esters, and polyoxyethylene-polyoxypropylene block polymers.

The reactive surfactant is not particularly limited as far as it has a radically polymerizable functional group. For instance, the reactive surfactant may have a structure such that a radically polymerizable functional group is incorporated in an aforementioned anionic surfactant or nonionic surfactant. Examples of the radically polymerizable functional group include vinyl group, propenyl group, isopropenyl group, vinyl ether group (vinyloxy group), and allyl ether group (allyloxy group). The concept of propenyl group referred to herein encompasses 1-propenyl group ($CH_3$—CH=CH—) and 2-propenyl group ($CH_2$=CH—$CH_2$— which may be called allyl group).

Examples of an anionic reactive surfactant include polyoxyethylene (allyloxymethyl) alkyl ether sulfates (e.g. ammonium salts), polyoxyethylene nonyl propenyl phenyl ether sulfates (e.g. ammonium salts), alkyl allyl sulfosuccinates (e.g. sodium salts), methacryloxy polyoxypropylene sulfuric acid ester salts (e.g. sodium salts), and polyoxyalkylene alkenyl ether sulfates (e.g. an ammonium salt having an isopropenyl group as the terminal alkenyl group). When the anionic reactive surfactant is forming a salt, the salt can be, for instance, a metal salt such as sodium salt or a non-metal salt such as ammonium salt and amine salt.

Examples of a nonionic reactive surfactant include polyoxyethylene nonyl propenyl phenyl ether.

Although no particular limitations are imposed, in some embodiments, a reactive surfactant having an oxyethylene chain can be preferably used. The oxyethylene chain refers to a structure of repeating oxyethylene units, that is, a structural moiety represented by —$(C_2H_4O)_n$—, with n indicating the number of repeats of the oxyethylene unit. For instance, in a preferable reactive surfactant, the number of repeats, n, is about 5 to 30 (e.g. 8 to 25).

From the standpoint of the polymerization stability during the emulsion polymerization, in some embodiments, it is preferable to use a reactive surfactant having a propenyl group. A preferable reactive surfactant has a propenyl group and also an oxyethylene chain.

From the standpoint of the emulsifying ability, etc., in some embodiments, an anionic reactive surfactant (e.g. an anionic reactive surfactant having an oxyethylene chain) can be preferably used. When the anionic reactive surfactant is in a salt form, as the salt, a non-metal salt is preferable. In particular, an ammonium salt is preferable.

When using a nonionic reactive surfactant, more favorable results can be obtained by the combined use with other surfactant(s), such as an anionic reactive surfactant, anionic non-reactive surfactant and nionionic non-reactive surfactant.

By carrying out emulsion polymerization of the starting monomer mixture in the presence of a reactive surfactant having a radically polymerizable functional group, the reactive surfactant may undergo a reaction to be incorporated into the base polymer (e.g. acrylic polymer). The reactive surfactant incorporated in the base polymer is less likely to bleed out to the PSA layer surface because its move within the PSA layer is limited. Accordingly, the use of the reactive surfactant can reduce bleed-out of a low molecular weight compound to the PSA layer surface. This is preferable from the standpoint of the low-contaminating properties. From the standpoint of obtaining greater low-contaminating properties, it is preferable to apply an embodiment using solely a reactive surfactant as the surfactant for emulsion polymerization.

The PSA layer of the protective sheet disclosed herein can be formed from various forms of PSA compositions. From the standpoint of reducing environmental stress, it is preferable to use a water dispersed PSA composition with at least some of the PSA dispersed in aqueous liquid. A favorable example of the water dispersed PSA composition is a water-dispersed acrylic PSA composition (a water-dispersed PSA composition comprising an acrylic polymer as the base polymer). Examples of other forms of the PSA composition include a PSA composition obtained by late-stage addition of the aqueous liquid disclosed herein to a solvent-based PSA composition containing the PSA (adhesive component(s)) in an organic solvent, an active energy ray-curable PSA composition formulated so as to cure with active energy rays such as UV rays and radioactive rays to form PSA, or a hot-melt PSA composition which is applied in the molten state by heating and forms PSA when it cools to near room temperature.

(Crosslinking Agent)

In the art disclosed herein, the PSA composition used to form the PSA layer preferably comprises a crosslinking agent. With the use of crosslinking agent, the surface hardness of the PSA layer can be suitably adjusted. The type of crosslinking agent used is not particularly limited and can be suitably selected from heretofore known crosslinking agents.

Specific examples of the crosslinking agent include oxazoline-based crosslinking agents, aziridine-based crosslinking agents, isocyanate-based crosslinking agents, epoxy-based crosslinking agents, melamine-based crosslinking agents, peroxide-based crosslinking agents, urea-based crosslinking agents, metal alkoxide-based crosslinking agents, metal chelate-based crosslinking agents, metal salt-based crosslinking agents, carbodiimide-based crosslinking agents, hydrazine-based crosslinking agents, amine-based crosslinking agents, and silane coupling agents. These can be used solely as one species or in a combination of two or more species. For instance, it is preferable to use one, two or more species selected from a group consisting of oxazoline-based crosslinking agents, aziridine-based crosslinking agents, isocyanate-based crosslinking agents and epoxy-based crosslinking agents. In particular, oxazoline-based crosslinking agent, isocyanate-based crosslinking agent and epoxy-based crosslinking agent are more preferable. In an embodiment using a water-dispersed PSA composition, a preferable crosslinking agent is soluble or dispersible in aqueous liquid and a particularly preferable crosslinking agent is soluble in aqueous liquid (i.e. water-soluble).

As the oxazoline-based crosslinking agent, a species having one or more oxazoline groups per molecule can be used without particular limitations. In the water-dispersed PSA composition, it is preferable to use an oxazoline-based crosslinking agent that is soluble or dispersible in aqueous liquid (an aqueously soluble or aqueously dispersible oxazoline-based crosslinking agent).

The oxazoline group can be either 2-oxazoling group, 3-oxazoline group or 4-oxazoline group. Usually, a 2-oxazoline group-containing oxazoline-based crosslinking agent can be preferably used. As the oxazoline-based crosslinking agent, a water-soluble copolymer or a water-dispersed copolymer can be used, which is obtained by copolymerizing an addition-polymerizable oxazoline such as 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline with other monomer(s).

Examples of a commercial oxazoline-based crosslinking agent include products of Nippon Shokubai Co., Ltd., under trade names EPOCROS WS-500, EPOCROS WS-700, EPOCROS K-2010E, EPOCROS K-2020E and EPOCROS K-2030E.

Examples of the aziridine-based crosslinking agent include trimethylolpropane tris[3-(1-aziridinyl) propionate] and trimethylolpropane tris[3-(1-(2-methyl) aziridinylpropionate)]. Examples of commercial aziridine-based crosslinking agent include product names CHEMITITE PZ-33 and CHEMITITE DZ-22E available from Nippon Shokubai Co., Ltd.

As an example of the isocyanate-based crosslinking agent, a bifunctional or higher polyfunctional isocyanate compound can be used. Examples include aromatic isocyanates such as tolylene diisocyanates, xylylene diisocyanate, polymethylene polyphenyl diisocyanate, tris(p-isocyanatophenyl)thiophosphate, and diphenylmethane diisocyanate; alicyclic isocyanates such as isophorone diisocyanate; and aliphatic isocyanates such as hexamethylene diisocyanate. Commercial products include isocyanate adducts such as trimethylolpropane/tolylene diisocyanate trimer adduct (trade name CORONATE L available from Tosoh Corporation), trimethylolpropane/hexamethylene diisocyanate trimer adduct (trade name CORONATE HL available from Tosoh Corporation) and hexamethylene diisocyanate isocyanurate (trade name CORONATE HX available from Tosoh Corporation). In the water-dispersed PSA composition, it is preferable to use an aqueously soluble or aqueously dispersible isocyanate-based crosslinking agent. For instance, a water-soluble, water-dispersible or self-emulsifying isocyanate-based crosslinking agent can be preferably used. A so-called blocked isocyanate-based crosslinking agent can be preferably used as an isocyanate-based crosslinking agent.

As the epoxy-based crosslinking agent, a species having two or more epoxy groups per molecule can be used without particular limitations. An epoxy-based crosslinking agent having 3 to 5 epoxy groups per molecule is preferable. In the water dispersed PSA composition, it is preferable to use an aqueously soluble or aqueously dispersible epoxy-based crosslinking agent.

Specific examples of the epoxy-based crosslinking agent include N,N,N',N'-tetraglycidyl-m-xylenediamine, 1,3-bis(N,N-diglycidylaminomethyl)cyclohexane, 1,6-hexanediol diglycidyl ether, polyethylene glycol diglycidyl ether, and polyglycerol polyglycidyl ether.

Commercial epoxy-based crosslinking agents include products of Mitsubishi Gas Chemical Co., Inc., under trade names TETRAD-X and TETRAD-C, a product of DIC Corporation under trade name EPICLON CR-5L, a product of Nagase ChemteX Corporation under trade name DENACOL EX-512, and a product of Nissan Chemical Industries, Ltd., under trade name TEPIC-G.

As the carbodiimide-based crosslinking agent, a low or high molecular weight compound having two or more carbodiimide groups can be used. In a water dispersed PSA composition, it is preferable to use an aqueously soluble or aqueously dispersible carbodiimide-based crosslinking agent. Examples of commercial carbodiimide-based crosslinking agents include the CARBODILITE series such as the CARBODILITE V series (aqueous solutions) including CARBODILITE V-02, CARBODILITE V-02-L2, and CARBODILITE V-04; and the CARBODILITE E series (aqueous dispersions) including CARBODILITE E-01, CARBODILITE E-02, and CARBODILITE E-04 available from Nisshinbo Holdings, Inc.

The crosslinking agent content (the total amount of crosslinking agent) in the PSA composition disclosed herein is not particularly limited and can be suitably selected in view of the composition and the molecular weight of the base polymer so as to obtain favorable properties after crosslinked. While no particular limitations are imposed, the amount of the crosslinking agent used to 100 parts by weight of the base polymer (typically an acrylic polymer) is usually about 0.01 part by weight or greater, suitably about 0.1 part by weight or greater, or preferably about 1 part by weight or greater (e.g. about 2 parts by weight or greater). From the standpoint of the adhesion, etc., the amount of the crosslinking agent is usually suitably about 15 parts by weight or less (preferably about 10 parts by weight or less, e.g. about 5 parts by weight or less) to 100 parts by weight of the base polymer. From the standpoint of increasing the tightness of adhesion to adherends, it is preferably about 4 parts by weight or less, more preferably less than 3.5 parts by weight, or yet more preferably less than 3 parts by weight.

(Phosphate)

The PSA composition (and also the PSA layer) disclosed herein may include a phosphate. Examples of the phosphate include alkyl phosphates such as lauryl phosphate and a lauryl phosphate salt; and a phosphate having an oxyethylene chain and a salt thereof. The salt can be, for instance, sodium salts, potassium salts, barium salts and triethanolamine salts of these phosphates. In the following, unless otherwise noted, the "phosphate" includes a salt. In particular, it is more preferable to use a phosphate having an oxyethylene chain. The oxyethylene chain-containing phosphate can suppress the increase in adhesive strength with aging (i.e. increase the stability of the adhesive strength) while preventing penetration of corrosion-induced components such as water, an acid and a base at the interface between the PSA layer and the adherend surface. Here, the oxyethylene chain refers to a structural moiety in chain form that includes at least one ethylene oxide (EO) unit and may further include other oxyalkylene unit(s) (e.g. oxyalkylene unit(s) with about 3 to 6 carbon atoms). One favorable example of the oxyethylene chain-containing phosphate is a phosphate having an oxyethylene chain formed with an EO unit or repeats of this. For instance, a phosphate represented by the next general formula (a) or a salt thereof can be preferably used.

[Chem 1]

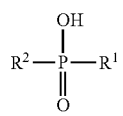

(a)

In the general formula (a), $R^1$ is —OH or —(OCH$_2$CH$_2$)$_n$OR$^3$; $R^2$ represents -(OCH$_2$CH$_2$)$_m$OR$^4$; n and m indicate the number of moles of EO added. The number of moles of EO added, n, is an integer between 1 and 30; it can be typically an integer between about 1 and 20, preferably an integer between about 1 and 10, for instance, an integer between about 1 and 8. The number of moles of EO added, n, is preferably an integer between about 1 and 6, or yet more preferably an integer between 1 and 4 (e.g. 2 and 4). In the general formula (a), the number of moles of EO added, m, can be typically about the same as the number of moles of EO added for n; n and m may be identical or different. $R^3$ and $R^4$ are mono-valent organic groups (typically hydrocarbon groups); for instance, each can be individually a group selected among an alkyl group, cycloalkyl group, aryl group, alkylaryl group, and arylalkyl group. $R^3$ and $R^4$ are preferably linear or branched alkyl groups, aryl groups or alkylaryl groups. $R^3$ and $R^4$ are individually an organic group with 1 to 30 carbon atoms, or possibly an organic group with 6 or more (preferably 8 or more, e.g. 11 or more) carbon atoms. In a preferable embodiment, $R^3$ and $R^4$ can be organic groups with 20 or fewer or preferably 18 or fewer, for instance, 15 or fewer carbon atoms. The phosphate salts represented by the general formula (a) can be, for instance, sodium salts, potassium salts, barium salts and triethanolamine salts of these phosphates. For the phosphate, solely one species or a combination of two or more species can be used.

Examples of the phosphates include polyoxyethylene alkylphosphoric acid esters such as polyoxyethylene tridecyl ether phosphate, polyoxyethylene lauryl ether phosphate, and polyoxyethylene octadecyl ether phosphate; and polyoxyethylene alkyl aryl phosphoric acid esters such as polyoxyethylene nonyl phenyl ether phosphate, polyoxyethylene octyl phenyl ether phosphate, polyoxyethylene dinonyl phenyl ether phosphate, and polyoxyethylene dioctyl phenyl ether phosphate. In an embodiment, a phosphoric acid ester having a molecular weight of 150 to 5000 can be preferably used.

The amount of phosphate used can be, for instance, about 0.05 part by weight or greater to 100 parts by weight of the base polymer (e.g. an acrylic polymer); it is usually preferably about 0.1 part by weight or greater, or more preferably about 0.3 part by weight or greater (e.g. about 0.5 part by weight or greater). From the standpoint of leaving a lower degree of contamination on the adherend surface, the amount of phosphate used to 100 parts by weight of the base polymer (e.g. an acrylic polymer) is usually suitably about 30 parts by weight or less (e.g. 20 parts by weight or less), preferably about 10 parts by weight or less, more preferably about 5 parts by weight or less, yet more preferably about 3 parts by weight or less, or particularly preferably about 2 parts by weight or less (e.g. 1 part by weight or less).
(Rust Inhibitor)

The PSA layer according to a preferable embodiment may include a rust inhibitor. The rust inhibitor is not particularly limited. Examples include amine compounds, azole-based compounds, nitrites, ammonium benzoate, ammonium phthalate, ammonium stearate, ammonium palmitate, ammonium oleate, ammonium carbonate, dicyclohexylaminebenzoic acid salts, urea, urotropin, thiourea, phenyl carbamate, and cyclohexylammonium-N-cyclohexyl carbamate (CHC). These rust inhibitors can be used singly as one species or in a combination of two or more species. Among them, amine-based compounds and azole-based compounds are preferable.

The amount of rust inhibitor (e.g. an amine-based compound (amine-based rust inhibitor) or an azole-based compound (azole-based rust inhibitor) is not particularly limited. It can be, for instance, 0.01 part by weight or greater (typically 0.05 part by weight or greater) to 100 parts by weight of the base polymer. From the standpoint of obtaining greater anti-erosion effects, the amount may be 0.1 part by weight or greater, 0.3 part by weight or greater, or even 0.5 part by weight or greater. On the other hand, from the standpoint of the prevention of erosion due to components and the PSA's cohesive strength, the rust inhibitor content is typically suitably below 8 parts by weight to 100 parts by weight of the base polymer; or it is possibly 6 parts by weight or less, preferably 5 parts by weight or less, for instance, 3 parts by weight or less, or even 1 part by weight or less. The art disclosed herein can be preferably implemented in an embodiment using essentially no rust inhibitor.

The PSA composition can comprise, as necessary, a known tackifier such as a rosin-based tackifier, terpene-based tackifier and hydrocarbon-based tackifier. From the standpoint of avoiding an excessive increase in peel strength, the amount of tackifier is preferably about 5 parts by weight or less to 100 parts by weight of the base polymer, or more preferably about 1 part by weight or less. For the protective sheet disclosed herein, the adhesive strength can be effectively controlled by the base polymer's composition and Tg as well as PSA's gel fraction, etc.; and therefore, the surface protective sheet can be preferably made in an embodiment using no tackifier as well.

The PSA composition may comprise, as necessary, various optional additives generally known in the field of PSA compositions, such as viscosity-adjusting agent (viscosifier, etc.), crosslinking accelerator, plasticizer, softener, filler, anti-static agent, anti-aging agent, UV-absorber, antioxidant, photo-stabilizing agent and defoamer. As the optional additive, an optional polymer different from the base polymer (e.g. an acrylic polymer) can be used as well. The optional polymer content is usually about 10% by weight or less (e.g. about 1% by weight or less) of the PSA composition. The PSA composition disclosed herein may be essentially free of the optional polymer. In the PSA composition according to an embodiment, the amount of plasticizer such as aliphatic acid ester can be limited to, for instance, below 10 parts by weight (e.g. below 1 part by weight) to 100 parts by weight of base polymer. In typical, the PSA composition may be essentially free of a plasticizer. The art disclosed herein can be preferably implemented in an embodiment essentially free of an anti-static agent (possibly a conducting agent) such as an ionic compound (e.g. ionic liquid, alkaline metal salt). With respect to other matters about these various optional additives, various heretofore known additives and methods can be selected based on technical common knowledge. Because these additives do not characterize the present invention in particular, details are omitted.

In the art disclosed herein, in an embodiment using a water dispersed PSA composition for PSA layer formation, the PSA composition can be prepared, for instance, by mixing an acrylic polymer dispersion in aqueous liquid obtained by emulsion polymerization using a surfactant with other components (e.g. crosslinking agent, phosphate, etc.) used as necessary. The aqueous liquid dispersion comprises the aqueous liquid disclosed herein. For instance, it is possible to use a polymerization reaction mixture obtained by emulsion polymerization or the polymerization reaction mixture subjected as necessary to a treatment such as pH adjustment (e.g. neutralization), non-volatile content adjustment and viscosity adjustment. In typical, the emulsion's dispersion stability can be increased by pH adjustment in a suitable range (e.g. in the range between about pH 6 and pH 9) with addition of a neutralizer such as ammonia water.

While no particular limitations are imposed, from the standpoint of efficient drying, etc., the non-volatile content (NV) of the PSA composition can be about 20% by weight or higher (typically about 30% by weight or higher, preferably about 40% by weight or higher). From the standpoint of the ease of application, etc., it can be about 75% by weight or lower (typically about 70% by weight or lower, preferably about 60% by weight or lower).

<Substrate Layer>

The protective sheet disclosed herein may include a substrate layer. As the substrate layer, resin film, a rubber sheet, a foam sheet, a composite of these, etc., can be used. Examples of the rubber sheet include natural rubber sheets and butyl rubber sheets. Examples of the foam sheet include polyurethane foam sheets, and polychloroprene rubber foam sheets.

The art disclosed herein can be preferably applied to a protective sheet wherein the substrate layer is resin film. The concept of "resin film" here refers to film typically obtained by molding a thin layer from a resin composition primarily comprising resin components as described below; it should be distinguished from so-called non-woven and woven fabrics. In other words, the concept of resin film excludes non-woven and woven fabrics. Preferable resin film is essentially not foamed. In other words, non-foamed resin film can be preferably used. Here, the non-foamed resin film refers to resin film that has not been deliberately subjected to a foaming process. In particular, the resin film may have an expansion ratio lower than about 1.1 (e.g. lower than 1.05, typically lower than 1.01).

Examples of the resin components forming the resin film include polyolefinic resins (polyethylene, polypropylene, ethylene-propylene copolymer, ethylene-vinyl acetate copolymer, etc.), poly(vinyl chloride)-based resins (typically soft poly(vinyl chloride)-based resin); poly(vinyl acetate)-based resin, polyurethane-based resins (ether-based polyurethane, ester-based polyurethane, carbonate-based polyurethane, etc.), urethane (meth)acrylate-based resin, thermoplastic elastomers (olefinic elastomer, styrene-based elastomer, acrylic elastomer, etc.), polyester-based resins (polyethylene terephthalate, polybutylene terephthalate, polyethylene naphthalate, polybutylene naphthalate, etc.), polycarbonate-based resin, polyamide-based resin, polyimide-based resin, fluororesin and cellulose-based resins such as cellophane resin. Among these resins, solely one species or a combination of two or more species can be used. Favorable examples of the resin film include polyolefinic resin film, polyester-based resin film and vinyl chloride-based resin film.

While no particular limitations are imposed, in the protective sheet according to an embodiment, it is preferable to use a substrate layer that comprises, as its primary component(s), one, two or more species of resin selected from the group consisting of polyolefinic resin, poly(vinyl chloride)-based resin, polyurethane-based resin, thermoplastic elastomer and polyester-based resin (typically a substrate layer comprising such resin in an amount exceeding 50% by weight). In another embodiment, in view of the performance, ease of handling, costs, etc., a substrate layer comprising a polyolefinic resin layer, polyester-based resin layer or polyvinyl chloride-based resin layer can be preferably used. Among the resin materials, in view of the heat stability, the lightness of weight, etc., polyolefinic resins, polyurethane-based resins and olefinic elastomers are preferable; in view of the handling properties, etc., polyolefinic resins and olefinic elastomers are particularly preferable.

The protective sheet disclosed herein can be preferably made in an embodiment comprising a substrate layer that comprises a polyolefinic resin as the primary component (e.g. more than 50% by weight), that is, an embodiment wherein the substrate layer is polyolefinic resin film. For instance, it is preferable to use polyolefinic resin film in which 50% by weight or more of the entire substrate layer is polyethylene (PE) resin or polypropylene (PP) resin. In other words, in the polyolefinic resin film, the combined amount of PE resin and PP resin may account for 50% by weight or more of the entire substrate layer. The polyolefinic resin film can be a blend of PE and PP resins.

The PP resin may comprise, as the primary component, various polymer species (propylene-based polymers) that comprise propylene as a monomer unit. The PP resin may be essentially formed of one, two or more species of propylene-based polymer. The concept of propylene-based polymer here includes homopolypropylene as well as a random copolymer of propylene and other monomer(s) (random polypropylene) and a block copolymer (block polypropylene). The concept of propylene-based polymer here includes, for instance, the following species:

Propylene homopolymer (homopolypropylene), for instance, isotactic polypropylene;

Random copolymer (random polypropylene) of propylene and other α-olefin(s) (typically, one, two or more species selected from ethylene and α-olefins having 4 to 10 carbon atoms), preferably random polypropylene comprising propylene as the primary monomer (i.e. the monomer accounting for 50% by weight or more of the total monomer content);

Block copolymer (block polypropylene) of propylene and other α-olefin(s) (typically, one, two or more species selected from ethylene and α-olefins having 4 to 10 carbon atoms), preferably block polypropylene comprising propylene as the primary monomer (i.e. the monomer accounting for 50% by weight or more of the total monomer content).

The PE resin may comprise, as the primary component, various types of polymer (ethylene-based polymer) comprising ethylene as a monomer. The PE resin may be essentially formed of one, two or more species of ethylene-based polymer. The ethylene-based polymer can be an ethylene homopolymer or a copolymer (random copolymer, block copolymer, etc.) of ethylene as the primary monomer and other α-olefin(s) as secondary monomer(s). Favorable examples of the α-olefins include α-olefins having 3 to 10 carbon atoms such as propylene, 1-butene (which can be a branched 1-butene), 1-hexene, 4-methyl-1-pentene and 1-octene. For instance, it is preferable to use PE resin that comprises, as the primary component, an ethylene-based polymer in which an α-olefin as the secondary monomer is copolymerized up to about 10% by weight (typically up to about 5% by weight).

The PE resin may comprise a copolymer of ethylene and a monomer (functional monomer) containing other functional group(s) in addition to a polymerizable functional group, copolymer of an ethylene-based polymer copolymerized with such a functional monomer, or the like. Examples of a copolymer of ethylene and a functional monomer include ethylene-vinyl acetate copolymers (EVA), ethylene-acrylic acid copolymers (EAA), ethylene-methacrylic acid copolymers (EMAA), ethylene-methyl acrylate copolymers (EMA), ethylene-ethyl acrylate copolymers (EEA), ethylene-methyl methacrylate copolymers (EMMA), and copolymers of ethylene and (meth)acrylic acid (i.e. acrylic acid and/or methacrylic acid) crosslinked by metal ions.

The PE resin is not particularly limited in density. The concept of PE resin here includes all of the following: high density polyethylene (HDPE), medium density polyethylene (MDPE), low density polyethylene (LDPE) and linear low density polyethylene (LLPDE). In an embodiment, the density of the PE resin can be, for instance, about 0.90 g/cm³ to 0.94 g/cm³. Preferable PE resins include LDPE and LLDPE. The PE resin may comprise one, two or more species of LDPE and one, two or more species of LLDPE. There are no particular limitations to the respective blend ratios of LDPE and LLDPE, or to the LDPE to LLDPE blend ratio. They can be suitably selected to form a PE resin having desirable properties. As the substrate layer of the protective sheet disclosed herein, it is preferable to use polyethylenic resin film such as LLDPE film whose LLDPE content is higher than 50% by weight (preferably about 75% by weight or higher, e.g. about 90% by weight or higher) and LDPE film whose LDPE content is higher than 50% by weight (preferably about 75% by weight or higher, e.g. about 90% by weight or higher). Laminate resin film comprising such polyethylenic resin film as a component can be used as well.

The resin film (e.g. polyolefinic resin film) used as the substrate layer of the protective sheet disclosed herein may comprise, as necessary, suitable components allowable in the substrate layer. Examples of additives that can be suitably added include filler, colorant (pigment such as inorganic pigment, dye), antioxidant, photostabilizer (including radical scavenger and UV absorber), antistatic agent, plasticizer, slip agent, and anti-blocking agent. Each additive can be added, for instance, in an amount similar to a typical amount in the field of resin film used as substrate layers and the like of protective sheets.

The substrate layer may have a mono-layer structure or a multi-layer structure formed of two, three or more layers. In a multi-layer structure, it is preferable that at least one layer (preferably each layer) is formed of aforementioned resin film. For instance, in a preferable substrate layer, 75% or more (more preferably 90% or more) of the thickness is attributed to mono-layer or multi-layer (typically mono-layer) polyolefinic resin film. The substrate layer may be entirely formed of mono-layer or multi-layer polyolefinic resin film. From the standpoint of the cost-effectiveness, it is preferable to use a substrate layer formed of mono-layer resin film (e.g. LLDPE film, LDPE film, etc.).

The method for producing the substrate layer can be suitably selected among heretofore known methods and is not particularly limited. For instance, when resin film is used as the substrate layer, it is possible to use resin film fabricated by suitably employing a heretofore known general film-forming method such as inflation molding, extrusion, T-die cast molding, and calendar roll molding.

In an embodiment where at least one face (the PSA layer-side face) of the substrate layer is a resin film surface, the resin film surface can be subjected to a heretofore known surface treatment such as corona discharge treatment, plasma treatment, ozone exposure, flame exposure, UV irradiation, acid treatment, alkali treatment, and primer coating. These surface treatments may enhance the tightness of adhesion between the substrate layer and the PSA layer, or the anchoring of the PSA layer onto the substrate layer. In an embodiment using polyolefinic resin film as the substrate layer, it is particularly meaningful to provide these surface treatments.

<Properties of Protective Sheet>

While no particular limitations are imposed, the protective sheet disclosed herein suitably has a chloride ion amount of less than 8.9 µg (e.g. about 8.5 µg or less) per gram of protective sheet, determined by hot water extraction. This helps obtain a configuration that brings about long-term prevention of erosion in the Low-E glass plate being protected and the protective sheet is likely to have excellent long-term reliability. The chloride ion amount per gram of protective sheet is preferably below 8.0 µg, more preferably below 7.0 µg, yet more preferably below 6.5 µg, or particularly preferably below 6.0 µg (e.g. below 5.5 µg). The minimum chloride ion amount per gram of protective sheet is ideally 0 µg; however, from the standpoint of the productivity, allowable level for practical use, etc., it can be about 1 µg or greater, about 3 µg or greater, or even about 5 µg or greater. The chloride ion amount per gram of protective sheet is determined by the method described below.

[Chloride Ion Amount of Protective Sheet]

The protective sheet subject to measurement is washed well with pure water, cut to a 50 cm² sized sheet area, placed in a polypropylene (PP) container and weighed. Using a drier, thermal extraction is carried out at 120° C. for one hour. With respect to the resulting extract, by the same method as the ion chromatography described later, chloride ions in the extract are quantified using a standard chloride ion solution to determine the chloride ion amount per gram of protective sheet used in the extraction.

The protective sheet disclosed herein suitably has an initial peel strength of about 0.01 N/20 mm or greater, determined at a tensile speed of 0.3 m/min at 180° peel angle after applied to a Low-E glass plate for 30 minutes. The protective sheet showing such initial peel strength can adhere well to an adherend in relatively short time, be less likely to lift off the adherend and provide good protection. In an embodiment, the initial peel strength can be about 0.05 N/20 mm or greater (e.g. about 0.1 N/20 mm or greater). In a preferable embodiment, the initial peel strength can be about 0.5 N/20 mm or greater (e.g. about 1 N/20 mm or greater). The maximum initial peel strength is not particularly limited. From the standpoint of the light peel, it is usually suitably about 5 N/20 mm or less, or preferably about 2.5 N/20 mm or less (e.g. about 2 N/20 mm or less). The initial peel strength is determined by the method described below.

[Initial Peel Strength]

The protective sheet to be measured is cut to a 20 mm wide by 100 mm long strip to prepare a test piece. In a standard environment at 23° C., 50% RH, with a 2 kg rubber roller moved back and forth twice, the test piece is press-bonded to a Low-E glass plate as the adherend. The sample is stored in the standard environment for 30 minutes. In the same standard environment, using a universal tensile tester, the initial peel strength (N/20 mm) is determined at a tensile speed of 0.3 m/min, at 180° peel angle. As the Low-E glass plate, product number RSFL6AS (100 mm×100 mm) available from Nippon Sheet Glass Co., Ltd. is used. It is noted that as the adherend, any Low-E glass plate can be used without particular limitations and a product comparable to RSFL6AS or other commercial Low-E glass plate can be used as well.

The protective sheet disclosed herein preferably has an aged peel strength of about 5 N/20 mm or less, determined at a tensile speed of 0.3 m/min, at 180° peel angle, after applied to a Low-E glass plate and stored at 50° C. for 7 days. With the protective sheet satisfying this property, even when it is applied to the adherend for a relatively long time, the aged adhesive strength is sufficiently suppressed and its light peel from adherend can be maintained. Thus, it shows excellent efficiency of removal from adherends. With the protective sheet having an aged peel strength of about 4 N/20 mm or less (more preferably about 2 N/20 mm or less), greater efficiency of removal can be obtained. From the standpoint of inhibiting lifting and peeling while the adherend is protected (e.g. during processing of the adherend with the protective sheet applied thereon), the aged peel strength is usually suitably about 0.05 N/20 mm or greater, preferably about 0.1 N/20 mm or greater, or more preferably about 0.3 N/20 mm or greater. The aged peel strength can also be about 1 N/20 mm or greater. The aged peel strength is determined by the method described below.

[Aged Peel Strength]

The protective sheet to be measured is cut to a 20 mm wide by 100 mm long strip to prepare a test piece. In a standard environment at 23° C., 50% RH, with a 2 kg rubber roller moved back and forth twice, the test piece is press-bonded to a Low-E glass plate as the adherend. The sample is stored in an environment at 50° C. for seven days and then in a standard environment at 23° C., 50% RH for one hour. Subsequently, in the same standard environment, using a universal tensile tester, the aged peel strength (N/20 mm) is determined at a tensile speed of 0.3 m/min, at 180° peel angle. The Low-E glass plate used as the adherend is the same as the one used in the initial peel strength measurement.

While no particular limitations are imposed, the protective sheet disclosed herein may have a ratio of aged peel strength $P_2$ (N/20 mm) to initial peel strength $P_1$ (N/20 mm) (i.e. a $P_2/P_1$ ratio value) of 5 or lower. A small $P_2/P_1$ ratio value indicates a small increase in peel strength with aging. By this, initial adhesion and light peel during removal are favorably combined. From such a standpoint, the $P_2/P_1$ ratio is preferably 4 or lower, more preferably 3 or lower, or yet more preferably 2 or lower, for instance, 1.8 or lower, 1.5 or lower, or even 1.3 or lower. The $P_2/P_1$ ratio is typically 0.8 or higher; it can be, for instance, 1 or higher.

From the standpoint of environmental sanity, the protective sheet disclosed herein preferably has a total amount of volatile organic compounds (VOC) of 1000 µg or less emitted from 1 g thereof (possibly including a substrate layer and a PSA layer, but not a release liner) when heated at 80° C. for 30 minutes (or, for short, a VOC emission of 1000 µg/g or less). The VOC emission is more preferably 500 µg/g or less (e.g. 300 µg/g or less, typically 100 µg/g or less). The VOC emission is determined by the next method.

[VOC Test]

The protective sheet is cut to a prescribed size (to an about 5 cm² sized area, here) and the release liner is removed to prepare a test piece. The test piece is placed and sealed in a 20 mL vial. The vial is then heated at 80° C. for 30 minutes and 1.0 mL of the heated gas (sample gas) is injected into a gas chromatograph (GC), using a head space autosampler (HSS). Based on the resulting gas chromatogram, the amount of gas emitted from the test piece is determined as an n-decane equivalent amount. From the resulting value, the VOC emission is determined per gram of protective sheet (µg/g, excluding the release liner). The n-decane equivalent amount is determined by applying a calibration curve prepared in advance for n-decane, with the intensities of emission gas obtained by GC Mass seen as equivalent to the intensities of n-decane. The HSS and GC settings are as follows:

HSS: model 7694 available from Agilent Technologies
  Heating time: 30 min
  Pressurization time: 0.12 min
  Loop filling time: 0.12 min
  Loop equilibration time: 0.05 min
  Injection time: 3 min
  Sample loop temperature: 160° C.
  Transfer line temperature: 200° C.

GC: model 6890 available from Agilent Technologies
  Column: J&W capillary column, product name DB-ffAP, available from GL
Science (0.533 mm inner diameter×30 m length, 1.0 µm thick membrane)
  Column temperature: 250° C. (temperature raised at 10° C./min from 40° C. to 90° C., followed at 20° C./min to 250° C. and maintained there for 5 min)
  Colum pressure: 24.3 kPa (constant flow mode)
  Carrier gas: helium (5.0 ml/min)
  Injection port: split (split ratio 12:1)
  Injection port temperature: 250° C.
  Detector: FID
  Detector temperature: 250° C.

The protective sheet disclosed herein may have a level of erosion inhibition graded as no discoloration in the Low-E glass plate discoloration test carried out by the method described later in Examples. The protective sheet satisfying this property can prevent the sort of corrosion in applications for protecting Low-E glass plates.

<Applications>

The protective sheet disclosed herein is favorable as a surface protective sheet for a glass plate used as a building material such as window glass, etc. The glass plate subject to application (protection) typically comprises a glass substrate and a coating layer placed on the glass substrate, wherein the coating layer may include a metal layer. More specifically, the glass plate may have a Low-E layer on one face. The Low-E layer usually includes a layer of metal such as silver. In producing the glass plate, the Low-E layer surface may be left exposed until two glass plates including the Low-E glass plate are assembled into a pair-glass (e.g. dual-pane glass) with the Low-E-layer-side surface on the inside. The protective sheet disclosed herein is preferably used to prevent the Low-E layer surface from damage, wear, degradation, corrosion, etc. In other words, the protective sheet can be used as a protective sheet for a Low-E layer surface. Low-E glass plates have higher levels of heat blocking or thermal insulation as compared to conventional glass plates and can improve the efficiency to cool down or heat up indoor spaces; and therefore, they are widely used as building materials such as window glass. The art disclosed herein may indirectly contribute to energy saving and reduction of greenhouse gas emissions.

From the standpoint of the efficiency of removal, the protective sheet disclosed herein is preferably used on an adherend having a large surface area on which the peel strength tends to be limited. The protective sheet disclosed herein is preferably used in an embodiment where it covers the entire surface of an adherend having a width of about 1 m or greater, for instance, about 2 m or greater (or even about 3 m or greater). The length of the adherend surface is equal to or greater than the width. In a preferable embodiment, it is preferably used in an embodiment where it entirely covers the surface of one face of a large flat plate (favorably, a flat plate with a smooth surface). In particular, glass plates used for building materials such as window glass are becoming progressively larger in view of efficient production, transportation, etc. It is preferably used in an embodiment where it covers the entire surface of a glass plate (typically the entire Low-E layer surface of the Low-E glass plate) having a large surface area (e.g. with a surface width above 2.6 m or even at or above about 3 m). A preferable embodiment of the art disclosed herein can bring about great erosion inhibition while maintaining light peel with respect to an adherend having such a large surface area.

The protective sheet according to some embodiments may show suppressed aged adhesive strength and thus may provide good efficiency of removal even when, for instance, the period of adhesion to the adherend (which can be the protection period for the adherend) becomes relatively long (typically two weeks or longer, e.g. four weeks or longer). Thus, for instance, it can be favorably used in an embodiment where the protective sheet is removed from the adherend (in particular, a Low-E glass plate) after being applied thereon for two weeks or more (e.g. four weeks or more).

The matters disclosed by this description include the following:

(1) A method for producing a glass unit, the method comprising:
  a step (A) of obtaining a Low-E glass plate comprising a glass substrate and a Low-E layer placed on the glass substrate;
  a step (B) of applying a protective sheet to a surface of the Low-E layer of the Low-E glass plate;
  an optional step (C) of subjecting the Low-E glass plate to at least one process selected from the group consisting of transportation, storage, processing, washing and handling;
  a step (D) of removing the protective sheet from the Low-E glass plate; and
  a step (E) of assembling a glass unit using the Low-E glass plate;
  wherein
  the protective sheet comprises a PSA layer,
  the PSA layer is formed from a PSA composition, and
  the PSA composition is prepared by a method comprising:
    a step of obtaining an aqueous liquid, and
    a step of obtaining a polymer-containing liquid comprising the aqueous liquid and a polymer; wherein the aqueous liquid satisfies at least one of the following:
      (a) having an electrical conductivity below 300 µS/cm, and
      (b) having a chloride ion concentration below 35 µg/mL.

(2) The method according to (1) above, wherein the Low-E glass plate has a width of 1 m or greater.

(3) The method according to (1) above, wherein the Low-E glass plate has a width of 2 m or greater.

(4) The method according to (1) above, wherein the Low-E glass plate has a width greater than 2.6 m.

(5) The method according to (1) above, wherein the Low-E glass plate has a width of 3 m or greater.

(6) The method according to any of (1) to (5) above, wherein the Low-E layer comprises a metal layer.

(7) The method according to any of (1) to (5) above, wherein the Low-E layer comprises a silver layer.

(8) The method according to any of (1) to (7) above, wherein the Low-E layer has a thickness of 1000 nm or less.

(9) The method according to any of (1) to (8) above, wherein the step (B) includes a step of entirely covering one face of the Low-E glass plate with at least the one protective sheet.

(10) The method according to any of (1) to (9) above, wherein the step (C) is essential and in the step (C), the Low-E glass plate is washed using water.

(11) A method for protecting a Low-E glass plate, the method comprising a step (application step) of applying a protective sheet to a surface of a Low-E glass plate that has a glass substrate and a Low-E layer placed on the glass substrate,
  wherein
  the protective sheet has a PSA layer,
  the PSA layer is formed from a PSA composition, and
  the PSA composition is prepared by a method comprising:
    a step of obtaining an aqueous liquid, and
    a step of obtaining a polymer containing liquid comprising the aqueous liquid and a polymer;
  wherein the aqueous liquid satisfies at least one of the following:
    (a) having an electrical conductivity below 300 µS/cm, and
    (b) having a chloride ion concentration below 35 µg/mL.

(12) The method according to (11) above,
  the method further comprising a step (removal step) of removing the protective sheet from the Low-E glass plate, and
  the method optionally including, between the application step and the removal step, at least one process selected from the group consisting of transportation, storage, processing, washing and handling of the Low-E glass plate with the protective sheet adhered thereon.

(13) The method according to (11) or (12) above, wherein the Low-E glass plate has a width of 1 m or greater, and the application step comprises a step of entirely covering one face of the Low-E glass plate with at least one said protective sheet.

(14) The method according to any of (1) to (13) above, wherein the PSA composition preparation comprises a step of obtaining the polymer by carrying out emulsion polymerization in the presence of the aqueous liquid.

(15) The method according to any of (1) to (14) above, wherein the PSA composition is a water-dispersed PSA composition in which the polymer is dispersed at least partially in the aqueous liquid.

(16) The method according to any of (1) to (15) above, wherein the chloride ion concentration of the aqueous liquid is below 15 µg/mL.

(17) The method according to any of (1) to (16) above, wherein the electrical conductivity of the aqueous liquid is 5 µS/cm or higher.

(18) The method according to any of (1) to (17) above, wherein the aqueous liquid has a total concentration of nitrate, sulfate and chloride ions below 50 µg/mL.

(19) The method according to any of (1) to (18) above, wherein the aqueous liquid has a ratio (Acv/C) of chloride ion concentration $A_{Cl}$ (µg/mL) to electrical conductivity C (µS/cm) of ⅕ or lower.

(19) The method according to any of (1) to (18) above, wherein the PSA composition is an acrylic PSA composition comprising an acrylic polymer as the polymer or a rubber-based PSA composition comprising a rubber-based polymer as the polymer.

(20) The method according to any of (1) to (19) above, wherein the protective sheet has an initial peel strength to Low-E glass plate of 5 N/20 mm or less.

(21) A method for preparing a PSA composition, the method comprising:
  a step of obtaining an aqueous liquid, and
  a step of obtaining a polymer-containing liquid comprising the aqueous liquid and a polymer;
  wherein the aqueous liquid satisfies at least one of the following:

(a) having an electrical conductivity below 300 µS/cm, and
(b) having a chloride ion concentration below 35 µg/mL.

(22) The method according to (21) above, the method comprising a step of obtaining the polymer by carrying out emulsion polymerization in the presence of the aqueous liquid.

(23) The method according to (21) or (22) above, wherein the PSA composition is a water-dispersed PSA composition in which the polymer is dispersed at least partially in the aqueous liquid.

(24) The method according to any of (21) to (23) above, wherein the chloride ion concentration of the aqueous liquid is below 15 µg/mL.

(25) The method according to any of (21) to (24) above, wherein the electrical conductivity of the aqueous liquid is 5 µS/cm or higher.

(26) The method according to any of (21) to (25) above, wherein the aqueous liquid has a total concentration of nitrate, sulfate and chloride ions below 50 µg/mL.

(27) The method according to any of (21) to (26) above, wherein the aqueous liquid has a ratio (Acv/C) of chloride ion concentration $A_{Cl}$ (µg/mL) to electrical conductivity C (µS/cm) of 1/5 or lower.

(28) The method according to any of (21) to (27) above, wherein the PSA composition is an acrylic PSA composition comprising an acrylic polymer as the polymer or a rubber-based PSA composition comprising a rubber-based polymer as the polymer.

(29) The method according to any of (21) to (28) above, wherein the PSA composition is used for protecting a Low-E glass plate.

(30) A method for producing a protective sheet, the method comprising
a step of obtaining a PSA composition by the method according to any of (21) to (29) above, and
a step of forming a PSA layer from the PSA composition.

(31) The method according to (30) above, wherein the protective sheet is a Low-E glass plate protective sheet.

(32) A method for producing a glass unit, the method comprising:
a step of obtaining a Low-E glass plate having a glass substrate and a Low-E layer placed on the glass substrate;
a step of applying the protective sheet produced by the method according to (30) or (31) above to a surface of the Low-E layer of the Low-E glass plate;
an optional step of subjecting the Low-E glass plate with the protective sheet adhered thereon to at least one process selected from the group consisting of transportation, storage, processing, washing and handling;
a step of removing the protective sheet from the Low-E glass plate; and
a step of assembling a glass unit using the Low-E glass plate.

Several working examples related to the present invention are described below, but the present invention should not be limited to these examples. In the description below, "part(s)" and "%" are by weight unless otherwise specified.

<Test Methods>
[Electrical Conductivity of Aqueous Liquid]
Measurement is carried out at room temperature (23° C.), using an EC meter. A portable EC meter ES-71 available from Horiba, Ltd. or a comparable product can be used for the measurement.

[Quantification of Ions in Aqueous Liquid]
Ion chromatography analysis was carried out, using the respective commercial standard ion solutions (available from Wako Pure Chemical industries, Ltd.). The ion chromatography conditions were as shown below.

(Analytical Conditions)
Anion Analysis:
  System: ICS-3000 available from Thermo Fisher Scientific
  Separation column: Dionex IonPac AS18-Fast (4 mm×250 mm)
  Guard column: Dionex IonPac AG18-Fast (4 mm×50 mm)
  Removal system: Dionex AERS-500 (external mode)
  Detector: electrical conductivity detector
  Eluent: aqueous KOH solution (eluent generator cartridge used)
  Eluent flow rate: 1.0 ml/min
  Sample injection volution: 250 µL Cation Analysis:
  System: DX-320 available from Thermo Fisher Scientific
  Separation column: Dionex Ion Pac CS16 (5 mm×250 mm)
  Guard column: Dionex Ion Pac CG16 (5 mm×50 mm)
  Removal system: Dionex CSRS-500 (recycle mode)
  Detector: electrical conductivity detector
  Eluent: aqueous methanesulfonic acid solution
  Eluent flow rate: 1.0 ml/min
  Sample injection volution: 25 µL

[Discoloration Test of Low-E Glass Plate]
The protective sheet subject to measurement is cut to a 20 mm wide, 100 mm long strip to prepare a test piece. In a standard environment at 23° C. and 50% RH, the test piece is press-bonded to the Low-E layer surface of a Low-E glass plate as the adherend with a 2 kg rubber roller moved back and forth twice. As the Low-E glass plate, product number RSFL6AS (100 mm×100 mm) available from Nippon Sheet Glass Co., Ltd. is used. The sample is stored in an environment at 40° C. and 92% RH for 7 days and the protective sheet is then removed. With respect to the area protected with the protective sheet, the state of the glass plate surface is visually inspected. The following grades are assigned: "Excellent" when no discoloration is observed, "Good" when a practically acceptable level of minor discoloration is observed, and "Fail" when discoloration is observed. It is noted that as the adherend, any Low-E glass plate can be used without particular limitations and a product comparable to RSFL6AS or other commercial Low-E glass plate can be used as well.

Example 1

Were mixed a starting monomer mixture comprising 58 parts of 2-ethylhexyl acrylate, 40 parts of n-butyl methacrylate and 2 parts of acrylic acid with 3 parts of surfactant (trade name AQUALON KH-1025 available from Dai-ichi Kogyo Seiyaku Co., Ltd.; ammonium polyoxyethylene-1-(allyloxymethyl) alkyl ether sulfate with up to 30 moles of added EO) and 150 parts of polymerization water. The resulting mixture was emulsified under nitrogen flow with an emulsifying machine (homo mixer) to prepare an emulsion of the starting monomers. Using a water softening system (product name MS-CL/FCL available from Miura Co., Ltd. with cation exchange resin), raw water was softened and the softened water (soft water) was used as the polymerization water. It is noted that the combined amount of calcium ions and magnesium ions in the treated water was below 1 g/mL.

Into a reaction vessel equipped with a thermometer, nitrogen inlet, condenser and stirrer, was placed the emulsion and heated under nitrogen flow to a liquid temperature of 50° C. while stirring. To this, was added 0.03 part of 2,2'-azobis(2-methylpropionamidine) dihydrochloride (product name V-50 available from Wako Pure Chemical industries, Ltd.) as polymerization initiator and the polymerization reaction was carried out for 5 hours while maintaining the liquid temperature around 50° C. To the resulting polymerization reaction mixture, was added ammonia water and adjusted to around pH 8. An aqueous dispersion of acrylic polymer was thus prepared.

To the aqueous dispersion, per 100 parts of non-volatiles therein, was mixed 2 parts of oxazoline-based crosslinking agent (product name EPOCROS WS-500 available from Nippon Shokubai Co., Ltd.) to prepare a PSA composition according to this Example. Of 55 μm thick polyethylene film having one face treated with corona discharge, onto the corona-treated face (first face), was applied the PSA composition with a bar coater to a dried thickness of 6 μm. This was dried at 70° C. for two minutes and then aged at 50° C. for one day to prepare an adhesively single-faced PSA sheet having an acrylic PSA layer on one face of a substrate layer formed of the polyethylene film. The resulting PSA sheet was used as the protective sheet according to this Example.

Example 2

Different raw water than Example 1 was softened in the same way as Example 1 and the resulting softened water (soft water) was used as the polymerization water. Otherwise in the same manner as Example 1, was obtained the protective sheet according to this Example.

Example 3

Using a reverse osmosis membrane system (product name OSMOCLEAR RO-FC available from Organo Corporation), raw water was subjected to RO treatment and the resulting RO-treated water (RO water) was used as the polymerization water. The RO treatment was carried out to a post-treatment electrical conductivity of 8 μS/cm. Otherwise in the same manner as Example 1, was obtained the protective sheet according to this Example.

Example 4

The RO treatment was carried out to a post-treatment electrical conductivity of 26 μS/cm. Otherwise in the same manner as Example 3, was obtained RO-treated water. Using the RO-treated water as the polymerization water, but otherwise in the same manner as Example 3, was obtained the protective sheet according to this Example.

Example 5

The RO treatment was carried out to a post-treatment electrical conductivity of 43 μS/cm. Otherwise in the same manner as Example 3, was obtained RO-treated water. Using the RO-treated water as the polymerization water, but otherwise in the same manner as Example 3, was obtained the protective sheet according to this Example.

Example 6

Using the raw water obtained in Example 2 as-is as the polymerization water, but otherwise in the same manner as Example 1, was obtained the protective sheet according to this Example.

Table 1 shows the Low-E glass plate discoloration test results of the respective protective sheets. Table 1 also shows the electrical conductivities and ion concentrations of the aqueous liquids used in the respective Examples.

TABLE 1

|  | Unit | Ex. 1 | Ex. 2 | Ex. 3 | Ex. 4 | Ex. 5 | Ex. 6 |
|---|---|---|---|---|---|---|---|
| EC | μS/cm | 310 | 364 | 8 | 26 | 43 | 334 |
| $[NO_3^-]$ | μg/mL | 15.0 | 12.2 | 0.6 | 4.3 | 8.1 | 19.2 |
| $[SO_4^{2-}]$ | μg/mL | 28.5 | 33.6 | 0.3 | 0.4 | 0.8 | 29.8 |
| $[Cl^-]$ | μg/mL | 17.4 | 21.9 | 0.6 | 2.5 | 4.6 | 35.4 |
| $[NO_3^-] + [SO_4^{2-}] + [Cl^-]$ | μg/mL | 60.9 | 67.7 | 1.4 | 7.2 | 13.4 | 84.4 |
| Low-E glass plate discoloration |  | Good | Good | Excellent | Excellent | Excellent | Fail |

EC: electrical conductivity

As shown in Table 1, in the preparation of PSA compositions, essentially no discoloration of Low-E glass plates was observed in the test with respect to Examples 1 to 5 using aqueous liquids with EC≥300 μS/cm and $[Cl^-]$<35 μg/mL or with EC<300 μS/cm. On the other hand, discoloration of Low-E glass plate was observed in Example 6 using an aqueous liquid with EC≥300 μS/cm and $[Cl^-]$≥35 μg/mL. These results indicate that Low-E glass plates can be protected from erosion with the use of an aqueous liquid that satisfies at least one of the following: having an electrical conductivity below 300 μS/cm and having a chloride ion concentration below 35 μg/mL.

Although specific embodiments of the present invention have been described in detail above, these are merely for illustrations and do not limit the scope of the claims. The art according to the claims includes various modifications and changes made to the specific embodiments illustrated above.

REFERENCE SIGNS LIST

1: substrate layer
1A: first face
1B: second face
2: PSA layer
2A: adhesive face
10: protective sheet
100: Low-E glass plate
110: glass substrate
120: Low-E layer
200: protective sheet 300: glass unit
320: another glass unit
310: spacer

The invention claimed is:

1. A method for producing a protective sheet applied to a surface of a Low-E layer on a glass plate, the method comprising:
   a step of obtaining a pressure-sensitive adhesive composition comprising:
      a step of obtaining an aqueous liquid, wherein the aqueous liquid has a chloride ion concentration of 0.6 μg/mL or higher and below 35 μg/mL, and
      a step of obtaining a polymer-containing liquid comprising the aqueous liquid and a base polymer; and
   a step of forming a pressure-sensitive adhesive layer from the pressure-sensitive adhesive composition,
   wherein the pressure-sensitive adhesive composition is an acrylic pressure-sensitive adhesive composition comprising an acrylic polymer, as the base polymer, or a rubber-based pressure-sensitive adhesive composition comprising a rubber-based polymer as the base polymer, and
   a glass transition temperature of a polymer contained in the pressure-sensitive adhesive composition is in a range of higher than −40° C. and 0° C. or lower.

2. The method according to claim 1, the method comprising a step of obtaining the base polymer by carrying out emulsion polymerization in the presence of the aqueous liquid.

3. The method according to claim 1, wherein the pressure-sensitive adhesive composition is a water-dispersed pressure-sensitive adhesive composition in which the base polymer is dispersed at least partially in the aqueous liquid.

4. The method according to claim 1, wherein the chloride ion concentration of the aqueous liquid is 2.5 μg/mL or higher and below 15 μg/mL.

5. The method according to claim 1, wherein an electrical conductivity of the aqueous liquid is 5 μS/cm or higher.

6. The method according to claim 1, wherein the aqueous liquid has a total concentration of nitrate, sulfate and chloride ions of 1.4 μg/mL or higher and below 50 μg/mL.

7. The method according to claim 1, wherein the aqueous liquid has a ratio ($A_{Cl}/C$) of chloride ion concentration $A_{Cl}$ (μg/mL) to electrical conductivity C (μS/cm) of 1/30 or higher and 1/5 or lower.

8. The method according to claim 1, wherein the aqueous liquid has an electrical conductivity of 5 μS/cm or higher and below 300 μS/cm.

9. The method according to claim 1, wherein the chloride ion concentration of the aqueous liquid is 0.6 μg/mL or higher and below 4.6 μg/mL or lower.

10. The method according to claim 1, wherein the aqueous liquid is obtained by anion exchange treatment or membrane separation treatment using a reverse osmosis membrane, nanofiltration membrane, ultrafiltration membrane, or precision filtration membrane.

11. The method according to claim 1, wherein the aqueous liquid is obtained by membrane separation using a reverse osmosis membrane, nanofiltration membrane, ultrafiltration membrane, or precision filtration membrane.

12. The method according to claim 1, wherein the Low-E glass plate protective sheet has an initial peel strength of 0.01 N/20 mm or greater and 5 N/20 mm or less, wherein the initial peel strength is determined at a tensile speed of 0.3 m/min at 180° peel angle after applied to a Low-E glass plate for 30 minutes.

13. The method according to claim 1, wherein the pressure-sensitive adhesive composition is a water-dispersed pressure-sensitive adhesive composition in which the base polymer is dispersed at least partially in the aqueous liquid, and the pressure-sensitive adhesive composition includes an oxazoline-based crosslinking agent.

14. The method according to claim 1, wherein
   the pressure-sensitive adhesive composition comprises an acrylic polymer, as the base polymer,
   the acrylic polymer comprises, as a monomer unit, an alkyl (meth)acrylate,
   the alkyl (meth)acrylate has a chemical structure of $CH_2=C(R^1)COOR^2$, wherein $R^1$ is a hydrogen atom or a methyl group, $R^2$ is an alkyl group having 1 to 20 carbon atoms, and
   the alkyl (meth)acrylate comprises an alkyl methacrylate and an alkyl acrylate, a ratio (CAM:CAA) of an amount CAM of the alkyl methacrylate to an amount CAA of the alkyl acrylate being 1:9 to 9:1 on weight basis.

15. The method according to claim 1, wherein the protective sheet has an aged peel strength of 0.05 N/20 mm or greater and 5 N/20 mm or less, wherein the aged peel strength is determined at a tensile speed of 0.3 m/min at 180° peel angle, after applied to a Low-E glass plate and stored at 50° C. for 7 days.

16. The method according to claim 1, wherein the aqueous liquid is obtained by a reverse osmosis membrane treatment.

17. The method according to claim 1, wherein the polymer contained in the pressure-sensitive adhesive composition consists essentially of an acrylic polymer having a glass transition temperature of higher than −40° C. and 0° C. or lower.

18. The method according to claim 1, wherein the polymer contained in the pressure-sensitive adhesive composition consists of an acrylic polymer having a glass transition temperature of higher than −40° C. and 0° C. or lower.

* * * * *